United States Patent
Huang et al.

(10) Patent No.: US 12,250,583 B2
(45) Date of Patent: Mar. 11, 2025

(54) COMMUNICATION METHOD AND APPARATUS

(71) Applicant: HUAWEI TECHNOLOGIES CO., LTD., Guangdong (CN)

(72) Inventors: Qufang Huang, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 17/853,446

(22) Filed: Jun. 29, 2022

(65) Prior Publication Data
US 2022/0330074 A1    Oct. 13, 2022

Related U.S. Application Data

(63) Continuation of application No. PCT/CN2019/130817, filed on Dec. 31, 2019.

(51) Int. Cl.
*H04W 24/10*    (2009.01)
*H04W 64/00*    (2009.01)

(52) U.S. Cl.
CPC .......... *H04W 24/10* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 10,555,208 B2 * | 2/2020 | Lee | H04W 72/21 |
| 10,904,310 B2 * | 1/2021 | Han | H04L 1/0006 |
| 2011/0216821 A1 | 9/2011 | Kim et al. | |
| 2014/0047485 A1 | 2/2014 | Shaw et al. | |
| 2016/0134948 A1 | 5/2016 | Xu et al. | |
| 2019/0215086 A1 * | 7/2019 | Kwak | H04B 17/24 |
| 2019/0261406 A1 | 8/2019 | Kim et al. | |
| 2020/0296749 A1 * | 9/2020 | Freda | H04W 72/20 |

FOREIGN PATENT DOCUMENTS

| | | |
|---|---|---|
| CN | 102857791 A | 1/2013 |
| CN | 1103607564 A | 2/2014 |
| CN | 106792110 A | 5/2017 |
| CN | 106937128 A | 7/2017 |
| CN | 107613338 A | 1/2018 |
| CN | 108932948 A | 12/2018 |
| CN | 109426333 A | 3/2019 |
| CN | 110234023 A | 9/2019 |

OTHER PUBLICATIONS

ITU-T H.265(Nov. 2019), Series H: Audiovisual and Multimedia Systems, Infrastructure of audiovisual services Coding of moving video, High efficiency video coding. 712 pages.

* cited by examiner

*Primary Examiner* — Xavier S Wong

(57) ABSTRACT

A communication method and apparatus are provided to improve an immersive experience of a user. The method includes: a terminal apparatus receives information from a network device, where the information indicates an air interface status or indicates an amount of data stored by the network device, the terminal apparatus receives data from the network device and processes the data based on the air interface status or the amount of data stored by the network device.

18 Claims, 14 Drawing Sheets

| Format 1: | LCID | I2 | | | |
|---|---|---|---|---|---|

| Format 2: | LCID | T | I2 | | |
|---|---|---|---|---|---|

| Format 3 | LCID | First layer | Information element 1 | Second layer | Information element 2 |
|---|---|---|---|---|---|

Format 1:

Format 2:

Format 3:

COMMUNICATION METHOD AND APPARATUS

CROSS-REFERENCE TO RELATED APPLICATIONS

This application is a continuation of International Application No. PCT/CN2019/130817, filed on Dec. 31, 2019, the disclosure of which is hereby incorporated by reference in its entirety.

TECHNICAL FIELD

Embodiments of this application relate to the field of communications technologies, and in particular, to a communication method and an apparatus.

BACKGROUND

With development of communications technologies, users can obtain increasingly rich experience by using electronic devices. For example, a user may obtain immersive experience by using an electronic device such as glasses or a helmet, and such immersive experience helps create a positive engagement. However, immersive experience has a vast amount of data and has a high requirement on a data transmission latency. A live broadcast of a concert is used as an example. Compared with a 3D video, an immersive video creates as close to the "you are there" experience as possible from a physical location of an audience. When a location of the audience changes, video and/or audio content viewed and/or heard by the audience also changes accordingly.

It can be learned that this communication scenario imposes a high requirement on a data transmission latency, but conventional wireless communications technologies cannot meet the transmission latency requirement in this scenario.

SUMMARY

Embodiments of this application provide a communication method, to improve user experience.

According to a first aspect, a communication method is provided. In this method, a network device determines an air interface status or an amount of stored data, and sends information that indicates the air interface status or the amount of data stored by the network device, to a terminal apparatus. Further, the network device sends data to the terminal apparatus, where the information indicates that the air interface status or the amount of data stored by the network device determines a processing manner of the data.

The terminal apparatus receives from the network device the information that indicates the air interface status or the amount of data stored by the network device, and processes the data received from the network device based on the air interface status or the amount of the data stored by the network device.

According to a second aspect, a communication method is provided. In this method, a network device determines an air interface status, sends information indicating the air interface status to a database server, obtains data generated based on the air interface status from a database server, and then sends the received data to a terminal apparatus.

The database server receives the information indicating the air interface status and location information of the terminal apparatus from the network device, generates data based on the air interface status and the location of the terminal apparatus, and sends the data to the network device.

In the foregoing aspects, the information that is sent by the network device to the terminal apparatus and that indicates the air interface status or the amount of data stored by the network device, is carried in a radio resource control (RRC) message, a Packet Data Convergence Protocol control protocol data unit (PDCP control PDU), or a Media Access Control control element (MAC CE).

When the information is carried in the MAC CE, the MAC CE is located in a MAC subPDU. The MAC subPDU includes a MAC subheader and the MAC CE. The MAC subheader includes a logical channel identifier (LCID). The LCID uses a preset value, where the preset value indicates that the MAC CE includes the foregoing information.

Optionally, the MAC CE further includes time information indicating that data is transmitted within a period of time indicated by the time information. Alternatively, the MAC CE excludes time information. The terminal apparatus receives the RRC message from the network device. The RRC message includes time information indicating that data is transmitted within a period of time indicated by the time information.

Optionally, the information (that is, the MAC CE) that is sent by the network device to the terminal apparatus and that indicates the air interface status or the amount of data stored by the network device includes at least one piece of layer information and at least one information element. Each information element corresponds to one piece of layer information and indicates a status or a data amount of a layer indicated by the layer information.

The terminal apparatus may periodically receive the information that indicates the air interface status or the amount of data stored by the network device from the network device. Alternatively, the terminal apparatus may receive the information from the network device when the amount of the data stored by the network device is greater than or equal to a threshold.

The terminal apparatus may also send first location information to the network device, where the first location information indicates a location of the terminal apparatus. The network device may further provide the location information to the database server, and the database server generates location data of the terminal apparatus based on the location information. Alternatively, the network device may generate the location data of the terminal apparatus based on the location information. Alternatively, the network device may further provide the location information to the database server, and the database server determines whether to provide more data to the terminal apparatus based on the location information. Alternatively, the network device may determine whether to provide more data to the terminal apparatus based on the location information. In this case, the network device or the database server determines, based on the location information, whether to provide more data of reference locations or more data of current reference locations to the terminal apparatus. The current reference locations may be determined by the terminal apparatus. For example, the terminal apparatus may also send second location information to the database server, where the second location information indicates a reference location.

The terminal apparatus may also send status indication information to the network device, where the status indication information indicates a status of the terminal apparatus. This helps the network device adjust a data transmission rate based on the status of the terminal apparatus.

According to a third aspect, a communication method is provided. In this method, a network device obtains data of a reference location from a database server, and receives location information from a terminal apparatus, where the location information indicates a location of the terminal apparatus. The network device generates downlink data to be sent to the terminal apparatus by using the data of the reference location based on the location of the terminal apparatus.

According to a fourth aspect, a communications apparatus is provided, including a unit or a means (means) configured to perform the steps according to any one of the implementations of the foregoing aspects.

According to a fifth aspect, a communications apparatus is provided, including a processor and an interface circuit. The processor is configured to communicate with another apparatus by using the interface circuit, and perform the method provided in any one of the implementations of the foregoing aspects. There are one or more processors.

According to a sixth aspect, a communications apparatus is provided, including a processor. The processor is configured to invoke a program stored in a memory, to perform the method provided in any one of the implementations of the foregoing aspects. The memory may be located inside or outside the apparatus. In addition, there are one or more processors.

The foregoing communications apparatus is located in a terminal apparatus, a network device, or a database server.

According to a seventh aspect, a computer program is provided. When the program is invoked by a processor, the method provided in any one of the implementations of the foregoing aspects is performed.

According to an eighth aspect, a computer-readable storage medium is provided, including a program. When the program is invoked by a processor, the method provided in any one of the implementations of the foregoing aspects is performed.

DESCRIPTION OF EMBODIMENTS

The following describes technical solutions in embodiments of this application with reference to accompanying drawings. The described embodiments are merely some but not all of the embodiments of this application. All other embodiments obtained by a person of ordinary skill in the art based on the embodiments of this application without creative efforts shall fall within the protection scope of this application.

With development of communications technologies, users can obtain increasingly rich experience by using electronic devices. For example, a user may obtain immersive experience by using an electronic device such as glasses or a helmet, and such immersive experience helps create a positive engagement. The following uses FIG. 1 as an example to describe a communications system that can provide an immersive service.

Figure 1:
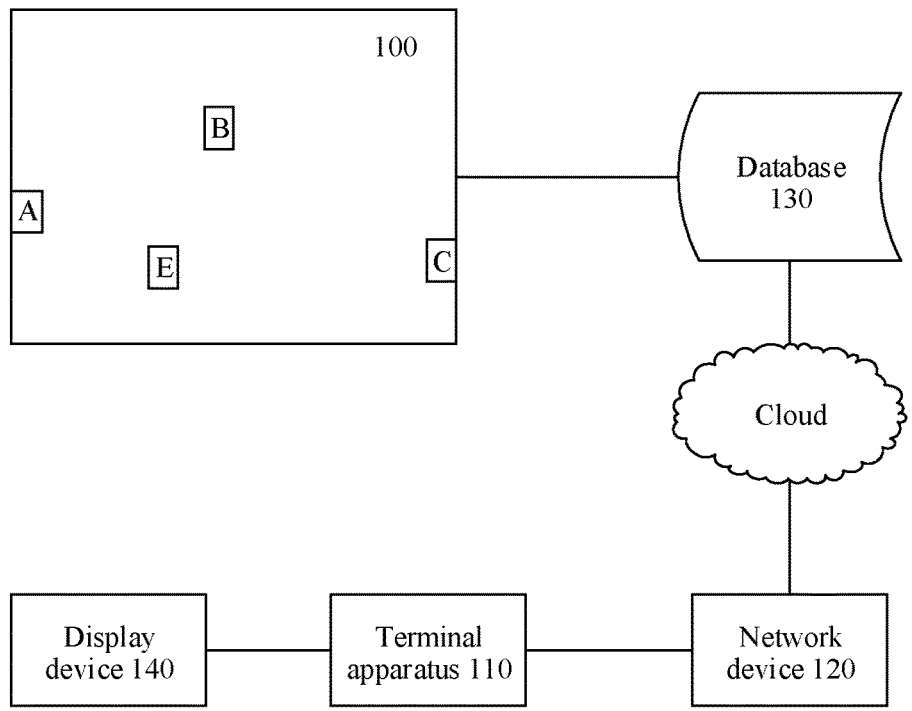
FIG. 1 is a schematic diagram of a communication system according to an embodiment of this application.

FIG. 1 is a schematic diagram of a communication system according to an embodiment of this application. In the communications system shown in FIG. 1, a terminal apparatus 110 communicates with another apparatus by using a wireless network. The wireless network includes a radio access network (RAN) and a core network (CN). The RAN is configured to connect a terminal apparatus to the wireless network, and the CN is configured to manage the terminal apparatus and provide a gateway for communication with an external network. The wireless network includes a network device 120. The network device 120 is, for example, a RAN device. The network device 120 is connected to a database 130. The database 130 may be located inside or outside the network device 120. When the database 130 is located outside the network device 120, a connection between the network device 120 and the database 130 may be direct or indirect. The indirect connection is performed by using another device, for example, a CN device or a gateway. In this case, the database 130 may be located in a server. The server is referred to as a database server. In addition, the network device 120 and the database 130 may be connected by using a cloud technology. The cloud technology allows resource sharing of hardware, software, a network, and the like in an area. In this way, the network device 120 can quickly access the database 130.

There is at least one collection point (which may also be referred to as a sampling point) in an environment 100. Collection points A, B, and C are used herein as an example.

A quantity and a location of the collection point are not limited in this application. A data collection apparatus, for example, a camera, is separately disposed at the collection points A, B, and C. Data collected by the data collection apparatuses forms a data set, which is stored in the database 130. The network device 120 obtains a location E of the terminal apparatus 110, and notifies the database server of the location E. The database server generates data (for example, audio and video data) of the location E by using the data stored in the database based on the location E, and transmits the data to the network device 120. The network device 120 transmits the data of the location E to the terminal apparatus 110. The terminal apparatus 110 receives the data sent by the network device 120, renders the data, generates an image and/or audio of the location E, and displays the image and/or the audio to a user by using a display device 140.

In the communications system, a location of a user, that is, the location of the terminal apparatus 110, may change. For the change in the location, it is expected that data can be updated in real time, to provide good experience for the user. Therefore, a high requirement is imposed on a data transmission latency.

In the foregoing or following embodiments of this application:

The terminal apparatus 110 may be a terminal, or an apparatus in the terminal (for example, a chip in the terminal). The terminal, also referred to as user equipment (UE), a mobile station (MS), a mobile terminal (MT), or the like, is a device that provides data connectivity for a user, for example, a handheld device or an in-vehicle device with a wireless connection function. Currently, for example, the terminal is a mobile phone (mobile phone), a tablet computer, a notebook computer, a palmtop computer, a mobile Internet device (MID), a wearable device, a virtual reality (VR) device, an augmented reality (AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), or a wireless terminal in a smart home (smart home).

The network device 120 is a device in a wireless network, for example, a RAN node that enables a terminal to access the wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, a home eNodeB or a home Node B), a baseband unit (BBU), or a wireless fidelity (Wi-Fi) access point (AP). In a network structure, the network device may be a centralized unit (CU) node, a distributed unit (DU) node, or a RAN device including a CU node and a DU node.

Figure 2:
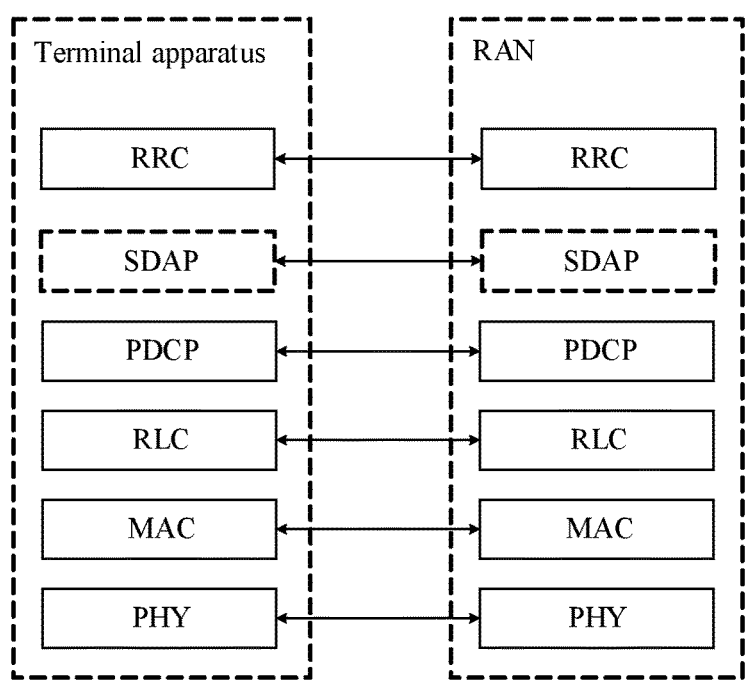
FIG. 2 is a schematic diagram of a protocol architecture according to an embodiment of this application.

FIG. 2 is a schematic diagram of a protocol architecture according to an embodiment of this application. As shown in FIG. 2, communication between a RAN device and a terminal apparatus complies with a specific protocol layer architecture. For example, a control plane protocol layer architecture may include functions of protocol layers such as a radio resource control (RRC) layer, a packet data convergence protocol (PDCP) layer, a radio link control (RLC) layer, a media access control (MAC) layer, and a physical layer. A user plane protocol layer architecture may include functions of protocol layers such as a PDCP layer, an RLC layer, a MAC layer, and a physical layer. In an implementation, a service data adaptation protocol (SDAP) layer may be further included above the PDCP layer, the physical layer may be denoted as a layer 1, and layers from the PDCP layer to the MAC layer may be denoted as a layer 2. The SDAP layer may be classified as the layer 2, or may not be classified as the layer 2.

Figure 3:
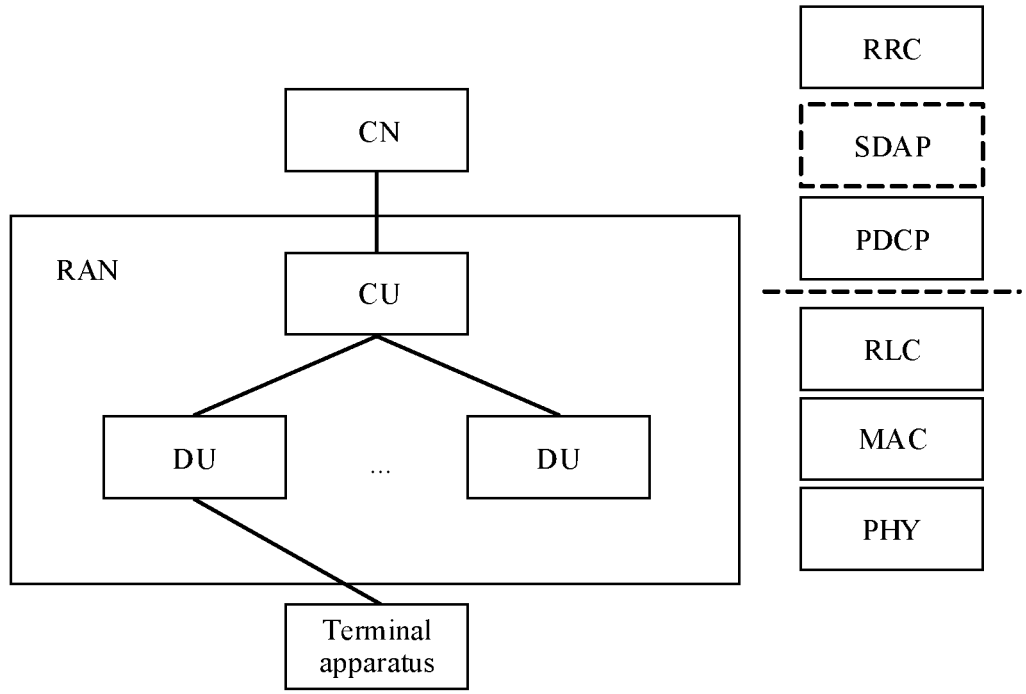
FIG. 3 is a schematic diagram of a network architecture according to an embodiment of this application.

FIG. 3 is a schematic diagram of a network architecture according to an embodiment of this application. As shown in FIG. 3, the network architecture includes a CN device and a RAN device. The RAN device includes a baseband apparatus and a radio frequency apparatus. The baseband apparatus may be implemented by using one node, or may be implemented by using a plurality of nodes. The radio frequency apparatus may be implemented remotely from the baseband apparatus, or may be integrated into the baseband apparatus, or a part of the radio frequency apparatus is disposed remotely from the baseband apparatus and a part of the radio frequency apparatus is integrated into the baseband apparatus. For example, the radio frequency apparatus includes a remote radio unit (RRU), the baseband apparatus includes a BBU, and the RRU is disposed remotely from the BBU.

The functions of the protocol layers in the RAN device in FIG. 2 may be implemented by using one node, or may be implemented by using a plurality of nodes. For example, in an evolved structure, the RAN device may include a central unit (CU) and a distributed unit (DU), and a plurality of DUs may be controlled by one CU in a centralized manner. As shown in FIG. 3, the CU and the DU may be divided based on protocol layers of a wireless network. For example, functions of the PDCP layer and protocol layers above the PDCP layer are set on the CU, and functions of protocol layers below the PDCP layer, such as the RLC layer and the MAC layer, are set on the DU.

Division based on the protocol layer is merely an example, and division may alternatively be performed based on another protocol layer. For example, division is performed based on the RLC layer. Functions of the RLC layer and a protocol layer above the RLC layer are set in the CU, and a function of a protocol layer below the RLC layer is set in the DU. Alternatively, division is performed based on the protocol layer. For example, some functions of the RLC layer and the function of the protocol layer above the RLC layer are set in the CU, and a remaining function of the RLC layer and the function of the protocol layer below the RLC layer are set in the DU. In addition, division may alternatively be performed in another manner. For example, the division is performed based on a latency. A function whose processing time needs to satisfy a latency requirement is set in the DU, and a function whose processing time does not need to satisfy the latency requirement is set in the CU.

Moreover, the radio frequency apparatus may not be disposed in the DU but is disposed remotely from the DU, or may be integrated into the DU, or a part of the radio frequency apparatus is disposed remotely from the DU and a remaining part is integrated into the DU. This is not limited herein.

Figure 4:
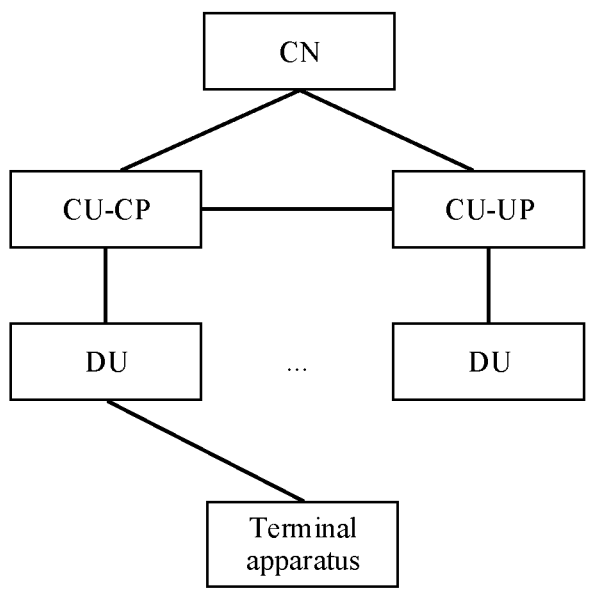
FIG. 4 is a schematic diagram of another network architecture according to an embodiment of this application.

Compared with the architecture shown in FIG. 3, further referring to FIG. 4, a control plane (CP) and a user plane (UP) of the CU may be separated and implemented by using different entities, which are respectively a control plane CU entity (CU-CP entity) and a user plane CU entity (CU-UP entity).

In the foregoing network architecture, signaling generated by the CU may be sent to a terminal apparatus through a DU, or signaling generated by the terminal apparatus may be sent to the CU through the DU. The DU may transparently transmit the signaling to the terminal apparatus or the CU by directly encapsulating the signaling at a protocol layer without parsing the signaling. In the following embodiments, if such signaling is transmitted between the DU and the terminal apparatus, sending or receiving of the signaling by the DU includes this scenario. For example, signaling at an RRC layer or a PDCP layer is finally processed as signaling at a PHY layer and sent to the terminal apparatus, or is converted from received signaling at the PHY layer. In this architecture, the signaling at the RRC layer or the PDCP layer may also be considered as being sent by the DU, or sent by the DU and a radio frequency.

In the foregoing embodiment, the CU is classified into a network device on a RAN side. In addition, the CU may be alternatively classified into a network device on a CN side. This is not limited herein.

An apparatus in the following embodiments of this application may be located in a terminal apparatus or a network device based on functions implemented by the apparatus. When the foregoing CU-DU structure is used, the network device may be a CU node, a DU node, or a RAN device including a CU node and a DU node.

Figure 5:
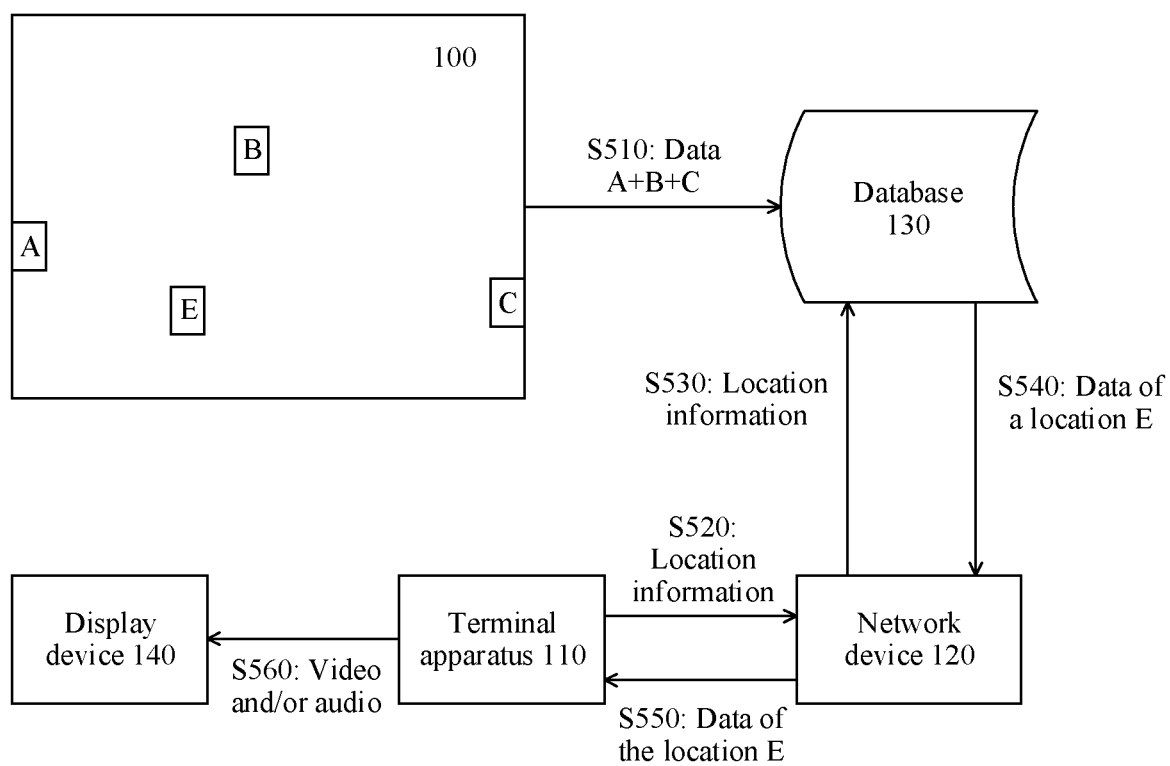
FIG. 5 is a schematic diagram of a communication procedure according to an embodiment of this application.

Still refer to FIG. 5. FIG. 5 provides a communication procedure. A user can obtain immersive experience with such a communication procedure. In the communication procedure, a database 130 stores data collected by all collection points. Based on a location E of the terminal apparatus 110, a server in which the database 130 is located (that is, a database server) generates data of the location E, and transmits the data to the terminal apparatus 110. After processing the received data, the terminal apparatus 110 displays the data to a user by using a display device 140. FIG. 5 shows collection points A, B, and C as an example. A data collection apparatus is separately disposed at the collection points A, B, and C in an environment 100. The data collection apparatuses at the collection points collect data, and provide the collected data to the server in step S510. The server stores the obtained data in the database 130. The data collection apparatus includes, for example, a video collection apparatus and/or an audio collection apparatus, and data collected by the data collection apparatus includes, for example, video data and/or audio data. Data collected by the data collection apparatus at the collection point A is denoted as data A, data collected by the data collection apparatus at the collection point B is denoted as data B, and data collected by the data collection apparatus at the collection point C is denoted as data C. The data A, B, and C may be collected by a same apparatus and then sent to the server, or may be separately sent to the server by various data collection apparatuses. In a scenario in which the data is collected by the same apparatus and then sent to the server, the apparatus sending all the data may be any one of the data collection apparatuses disposed at the collection points A, B, and C, or may be a separately disposed data gathering apparatus. The data gathering apparatus is configured to collect the data from the data collection apparatuses, and sends the data to the server.

The foregoing data collection process may be started by a trigger event, or may be periodically started, or may be continuously performed within a period of time. In addition, after the data collection process is started, the data collection may be performed periodically or continuously. A data collection cycle may be set based on an actual requirement and is not limited.

In this way, the server may collect time-frequency and/or audio data of the collection points (which may be understood as a plurality of observation points) in advance, and store the data in the database. The data in the database may be continuously or periodically updated.

The terminal apparatus 110 generates location information of the terminal apparatus based on a location of the terminal apparatus 110, which is denoted as a location E, and sends the location information to the network device 120 in step S520. The network device 120 obtains data of the location E from the database 130 based on the location information. If the database 130 is located in the network device 120, the network device 120 directly generates the data of the location E by using data stored in a local database based on the location E. If the database 130 is independent of the network device 120, for example, located in the server, the network device 120 sends the location information of the terminal apparatus to the server in step S530. The server generates the data of the location E by using the stored data based on the location information of the terminal apparatus, and sends the data of the location E to the network device 120 in step S540. Then, the server sends the data of the location E to the terminal apparatus 110 in step S550. The terminal apparatus 110 renders the received data of the location E to generate a video and/or audio, and displays the video and/or audio to a user by using a display device 140 in step S560.

Videos and/or audios vary with locations relative to the collection points A, B, and C. The database server may determine the location of the location E relative to the collection points A, B, and C based on the location information, and may generate the data of the location E based on the data of the collection points A, B, and C by using the location of the terminal apparatus as a reference. As such, the data of the location E may represent a video and/or audio that can be observed at the location E. In addition, different algorithms may be used to generate the data of the location E for images with different definitions. A higher definition indicates a more complex algorithm and a longer processing delay.

A transmission capacity between the network device 120 and the terminal apparatus 110 is limited, and a data amount of the video and/or audio (especially a high definition video) is large. Therefore, the data of the location E transmitted in step S540 may be complete video and/or audio data of the location E, or may be a part of the complete data, that is, partial data. The data transmitted in step S550 may be complete data or partial data. Alternatively, the data of the location E transmitted in step S540 may be complete data, and the network device 120 determines to transmit complete data or partial data. In this case, the data transmitted in step S550 may be complete data or partial data. When receiving the partial data, the terminal apparatus 110 may render the received data to supplement a missing part, to display a video and/or audio to a user. In this case, the data finally displayed includes both real data and rendered data. Rendering means inferring details of an image by using an algorithm based on a main part of the image, to supplement the image. This improves image quality.

With the foregoing communication procedure, a user can obtain immersive experience. When generating the data of the location E, the server does not know how much data can be transmitted over an air interface. Therefore, the data is generated based on a highest definition, complexity is high, and a corresponding processing delay is long. However, only a part of the data may be finally transmitted to the terminal apparatus. After obtaining the data of the location E from the network device, the terminal apparatus determines a rendering algorithm based on the data amount and performs rendering. A corresponding processing delay is long.

In response to the foregoing technical problems, in an implementation, the network device may provide air interface information for a server. In this case, when generating the data of the location E, the server may know the air interface information, and then optimize a data generation algorithm based on the air interface information. This accelerates a data generation processing speed of the location E, reduces the processing delay, and further improves user experience. For example, the air interface information includes one or more of the following information: a rate, a bandwidth (or referred to as a frequency resource size), radio signal quality, a quantity of antennas, or the like. The server may determine a transmission capacity between the network device and the terminal apparatus based on the air interface information, and then generate data of the location E that is allowed by the transmission capacity. In other words, a smaller transmission capacity generates lower definition data, and the lower definition data requires a lower complexity algorithm, causing a lower processing delay. In addition, even if highest definition data is generated, the data cannot be transmitted to the terminal apparatus because a transmission capacity between the network device and the terminal apparatus is limited. Therefore, such manner can reduce the processing delay while maintaining video and/or audio quality.

In another implementation, a network device may provide air interface information for a terminal apparatus. In this way, the terminal apparatus can pre-estimate or determine an amount of data sent by the network device, so as to determine a processing manner (for example, a rendering algorithm) in advance and prepare for the processing. This accelerates a processing speed, reduces a processing delay, and improves user experience.

The following is described with reference to the accompanying drawings.

Figure 6:
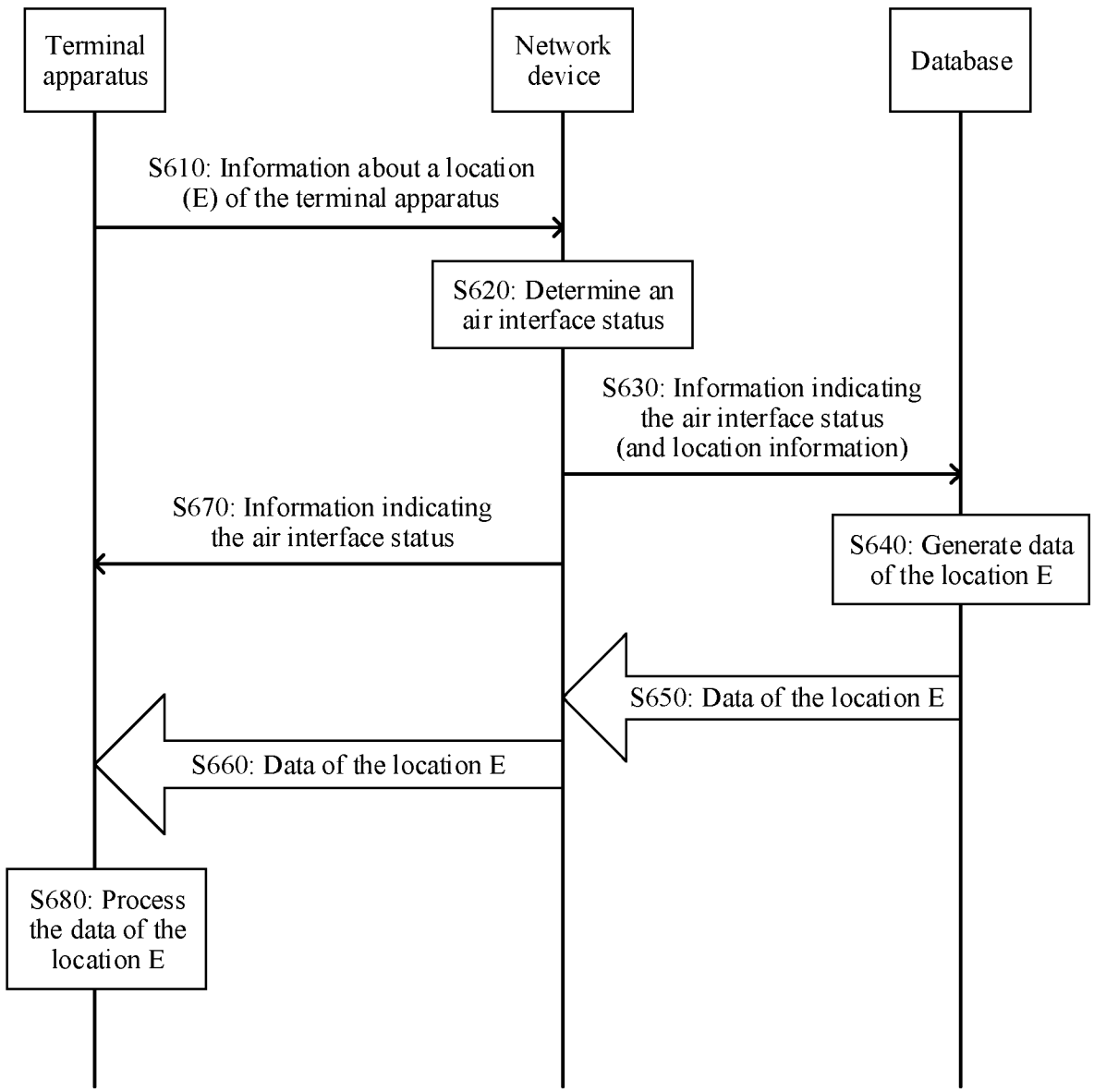
FIG. 6 is a schematic diagram of a communication method according to an embodiment of this application.

FIG. 6 is a schematic diagram of a communication method according to an embodiment of this application. As shown in FIG. 6, the method includes the following steps.

S610: A terminal apparatus determines a location of the terminal apparatus, and indicates the location to a network device, that is, the terminal apparatus sends location information to the network device. The network device receives the location information of the terminal apparatus from the terminal apparatus, that is, receives the location information from the terminal apparatus. The location information indicates the location of the terminal apparatus, and the location of the terminal apparatus is denoted by E.

Optionally, the location of the terminal apparatus includes, for example, coordinates of the terminal apparatus. The coordinates are, for example, longitude and latitude. In this case, the location information of the terminal apparatus indicates the longitude and the latitude. Alternatively, a reference point is configured. The reference point may be an actually configured collection point or a virtual reference point. The coordinates of the terminal apparatus include coordinate values of a north-south horizontal line, an east-west horizontal line, and a vertical line relative to the reference point. Based on the coordinate values, the location of the terminal apparatus in a coordinate system may be determined. In this case, the location information of the terminal apparatus indicates coordinate values of the terminal apparatus relative to the reference point. The foregoing coordinate lines are a north-south horizontal line, an east-west horizontal line, and a vertical line, and may alternatively be a coordinate line in another direction. This is not limited in this embodiment of this application.

S620: The network device determines an air interface status.

The air interface status is an air interface status of the terminal apparatus. In an implementation, the air interface status may represent an amount of data that can be transmitted by the network device to the terminal apparatus, for example, an amount of data that can be transmitted to the terminal apparatus in a time unit. The network device and a database server have same understanding of the time unit. In this case, the air interface status may be a data amount. A unit may be a bit, a byte (byte), or the like. The unit is not limited in this embodiment of this application. The time unit is, for example, a slot, an orthogonal frequency division multiplexing (OFDM) symbol, a subframe, or a frame, or may be a preset time value, for example, 0.5 ms, 1 ms, or another time value. This is not limited in this embodiment of this application.

In another implementation, the air interface status may be represented by using an air interface rate, that is, an amount of data transmitted in a unit time. The unit time may be the foregoing time unit. It can be learned that implementations of the data amount and the rate are similar, and a difference lies in units. In addition, for the data amount, the network device and the database server have same understanding of the time unit.

Further, the rate or the data amount may be divided by layer, for example, divided into a first layer rate and a second layer rate. Alternatively, the rate or the data amount may be divided by proportion, for example, a proportion of the first layer rate to the second layer rate. Byte is used as an example. The first layer rate is N1 bytes per unit time, and the second layer rate is N2 bytes per unit time. Alternatively, a proportion of an amount of data transmitted per unit time at a first layer to an amount of data transmitted per unit time at a second layer is M1:M2, or the amount of data transmitted per unit time at the first layer occupies P % of a total amount of data transmitted per unit time, or the amount of data transmitted per unit time at the second layer occupies Q % of the total amount of data transmitted per unit time. N1, N2, P, and Q are all non-negative numbers, and M1 and M2 are positive integers. For example, the first layer is a base layer, and the second layer is an enhancement layer. Data at the base layer may represent a basic framework of an image. This may be understood as that the terminal apparatus can generate an image (with a low definition) based on the data at the base layer. Data at the enhancement layer includes detailed information of the image, and the terminal apparatus can generate a higher definition image based on the data at the base layer and the enhancement layer. Only two-layer division is used herein as an example, which is not limited in this embodiment of this application. The data of the terminal apparatus may be divided into data of at least two layers, including a base layer and more than one enhancement layer. An image corresponding to an enhancement layer of each layer varies in definition. When priorities of a plurality of layers are different but the air interface is insufficient to accommodate data of all the layers, data at a higher-priority layer is preferentially transmitted. In an implementation, the base layer has a highest priority. When there are a plurality of enhancement layers, an enhancement layer that corresponds to a higher definition image has a lower priority.

In another implementation, the air interface status may be represented as a frequency resource size of the air interface. The frequency resource size is, for example, a maximum frequency resource that can be allocated by the network device to the terminal apparatus, or a current bandwidth size or a current bandwidth part (BP) size of a carrier used by the network device. A larger frequency resource indicates that more resources can be used by the network device. Therefore, a transmission capacity between the network device and the terminal apparatus is larger.

In still another implementation, the air interface status may be represented as radio signal quality (or referred to as channel quality), for example, reference signal received power (RSRP) or reference signal received quality (RSRQ). Better radio signal quality indicates that more data can be transmitted by the network device. Therefore, the transmission capacity between the network device and the terminal apparatus is larger.

In still another implementation, the air interface status may be represented as a quantity of antennas. A larger quantity of antennas indicates a higher transmission capability of the network device. Therefore, the transmission capacity between the network device and the terminal apparatus is larger.

Therefore, the foregoing air interface status includes, for example, one or more of the following information: a rate, a bandwidth (or referred to as a frequency resource size), radio signal quality, or a quantity of antennas. The rate may also be referred to as a transmission rate.

In an implementation, the network device may determine the air interface status based on information such as a service priority or quality of service (QoS) of the terminal apparatus. For example, the rate is determined based on the service priority of the terminal apparatus.

S630: The network device provides the air interface status tor the database server. In other words, the network device sends information indicating the air interface status (referred to as information I1 below) to the database server, where the database server is a server in which a database is located.

The foregoing step S610 may be performed before step S630, or may be performed after step S630. To be specific, the network device may obtain the location information of the terminal apparatus before sending the information I1 to the data server. In this case, the network device may send the information I1 and the location information together to the database server, to simplify a signaling process. Optionally, the information I1 and the location information may also be separately sent to the database server. When the network device obtains the location information of the terminal apparatus after providing the air interface status to the data server, the network device may send the information I1 and then the location information to the database server.

If the rate or the data amount of the air interface has been divided by layer, the network device may notify the database server of the divided rate or data amount. For example, the information I1 includes rate information or data amount information of a plurality of layers, for example, first layer rate information and second layer rate information; or includes a proportion of rates between a plurality of layers, for example, a proportion of a first layer rate to a second layer rate. Alternatively, the information I1 may include data amount information of a plurality of layers, for example, first-layer data amount information and second-layer data amount information; or include a proportion of data amounts between a plurality of layers, for example, a proportion of a first-layer data amount and a second-layer data amount.

The database server receives the information I1 and the location information of the terminal apparatus (that is, information about a location E), and performs the following operations based on the received information:

S640: The database server generates, based on the air interface status and the location of the terminal apparatus, data of the location (referred to as data D1 below), that is, data of the location E.

In an implementation, the database server generates, based on a location of the terminal apparatus, preset definition data of the location, and divides the data into several layers. Specific division is the same as that in the foregoing embodiment and is not described herein again. The database server then determines, based on an air interface status, one or more layers whose data is to be transmitted. The database server pre-configures a default data generation algorithm and/or a parameter. The data generation algorithm and/or the parameter uses data collected from a collection point to generate preset definition data of a location of the terminal apparatus. Generally, the default data generation algorithm and/or parameter generates high definition data, but the air interface status does not allow transmission of so much data. Therefore, data of some layers may be transmitted to the network device. The data transmitted to the network device is understood as the data D1 herein, that is, the data of the location E. In other words, the data D1 is a part or all of the data generated by the database server.

In another implementation, the database server determines the data generation algorithm and/or the parameter based on the air interface status, where different data generation algorithms and/or parameters correspondingly generate data with different definitions. The database server generates the data D1, that is, the data of the location E, based on the location of the terminal apparatus and the selected data generation algorithm and/or parameter, and sends the data D1 to the network device.

The database server may preset a plurality of data generation algorithms. Each data generation algorithm corresponds to different definitions and is applicable to different air interface statuses. Alternatively, the database server may preset one data generation algorithm, and different parameters correspond to different definitions and are applicable to different air interface statuses. Alternatively, the database server may preset a plurality of data generation algorithms, and different parameters are applicable to different data generation algorithms, to generate data with different definitions. Alternatively, in each algorithm, different parameters further generate data with a more fine-granularity definition.

S650: The database server sends the data D1 to the network device, and the network device correspondingly obtains the data D1, that is, the data of the location E, from the database server.

S660: The network device sends the data D1, that is, the data of the location E, to the terminal apparatus.

In addition, the network device may further provide the foregoing air interface status to the terminal apparatus, so that the terminal apparatus determines a data processing manner based on the air interface status. In this way, the terminal apparatus may prepare for the processing of the received data in advance. This accelerates a processing speed, reduces a processing delay, and improves user experience. In this case, the foregoing method further includes:

S670: The network device provides the air interface status to the terminal apparatus, that is, the network device sends information indicating the air interface status to the terminal apparatus.

Descriptions of the air interface status are the same as those in the foregoing step S630, and details are not described herein again. When the air interface status is a data amount, the network device and the terminal apparatus have same understanding of a time unit.

If the network device has stored data to be sent to the terminal apparatus, or predetermined an amount of data to be sent to the terminal apparatus based on the air interface status, the network device may send data amount indication information to the terminal apparatus. The data amount indication information indicates an amount of data to be transmitted by the network device to the terminal apparatus or an amount of data stored by the network device.

The amount of data to be transmitted by the network device to the terminal apparatus may be understood as the air interface status being the data amount. The amount of data stored by the network device may be understood as the air interface status being the data amount, or may be separately determined by the network device based on the amount of data stored by the network device.

Therefore, in the foregoing step S670, the network device may send information indicating the air interface status to the terminal apparatus, or may send information indicating the amount of data stored by the network device to the terminal apparatus. In other words, the network device sends second information I2 to the terminal apparatus. The second information indicates the air interface status or the amount of data stored by the network device, that is, buffer status of the network device.

If the information I2 indicates the data amount, the information I2 may indicate the data amount directly or in a proportion manner. For example, if a data amount corresponding to the data with a preset definition is 100%, and a current data amount accounts for S % of a data amount corresponding to the data with the preset definition, the information I2 indicates S %. The preset definition is, for example, a highest definition.

The terminal apparatus receives the information I2, and performs the following operations:

S680: The terminal apparatus processes the received data D1, that is, the data of the location E, based on the information I2.

The terminal apparatus may receive the data of the location E only after receiving information I2. In this case, the terminal apparatus determines, based on the information I2, a data processing manner, for example, a rendering algorithm and/or a parameter. In this way, data processing is prepared in advance. When receiving the data D1, the terminal apparatus processes the data D1, and displays the processed data by using a display device. The terminal apparatus may have received the data of the location E before receiving the information I2. Then, the terminal apparatus determines a data processing manner based on the information I2 or based on the received data, and processes the previously stored data of the location E. After receiving new data subsequently, the terminal apparatus may update the processed data, and display the processed data by using the display device.

The terminal apparatus may preset a plurality of data processing algorithms (for example, a rendering algorithm), and each data processing algorithm corresponds to different definitions and is applicable to different air interface statuses or amounts of data. Alternatively, the terminal apparatus may preset a data processing algorithm (for example, a rendering algorithm), and different parameters correspond to different definitions and are applicable to different air interface statuses or amounts of data. Alternatively, the terminal apparatus may preset a plurality of data processing algorithms, and different parameters are applicable to different data processing algorithms, to process data with different definitions. Alternatively in each algorithm, different parameters further process data of a more fine-granularity definition.

Optionally, in the foregoing step S610, the terminal apparatus may further indicate a field of view to the network device. In other words, the foregoing method may further include: The terminal apparatus sending field of view information to the network device. The network device receives the field of view information of the terminal apparatus from the terminal apparatus, that is, receives the field of view information from the terminal apparatus. The field of view information indicates the field of view of the terminal apparatus. Subsequently, the network device further provides the field of view information and the location information to the database server, so that the database server generates data corresponding to the location and the field of view. In this way, the database server may limit the generated data to a scope of a specific field of view. This further reduces an amount of the generated data, reduces a processing delay, and further improves user experience. In the following other embodiments, in addition to providing the location information to the network device or the database server, the terminal apparatus may further provide the field of view information. Details are not described in the following embodiments.

In the foregoing step S670, the network device may send the information I2 to the terminal apparatus by using an RRC message, a PDCP control protocol data unit (PDU), or a MAC control element (MAC CE). When the information is sent by using the MAC CE, a subheader of a MAP subPDU in which the MAC CE is located includes a logical channel identifier (LCID). The LCID uses a preset value, to which a new meaning is assigned. In other words, the preset value indicates that the MAC CE indicates an air interface status or an amount of data stored by the network device. To be specific, the MAC CE is located in the MAC subPDU. The MAC subPDU includes a MAC subheader and the MAC CE. The MAC subheader includes the LCID. The LCID uses a preset value. The preset value indicates that the MAC CE includes the foregoing information I2.

Figure 7:
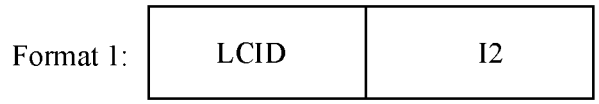
FIG. 7 is a schematic diagram of several formats of a MAC subPDU according to an embodiment of this application.
Figure 7:
Figure 7:
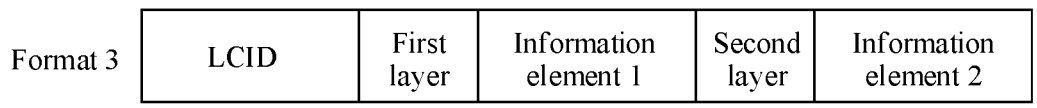

FIG. 7 is a schematic diagram of several formats of a MAC subPDU according to an embodiment of this application. As shown in FIG. 7, the MAC subheader of the MAC subPDU shows only a related field, for example, an LCID field in the MAC subheader. The MAC subheader may further include another field. This is not limited in this embodiment of this application. In a format 1, the MAC CE includes only the information I2. The information I2 indicates an air interface status or an amount of data stored by the network device. For example, the information I2 indicates that the data amount corresponding to N (N is a positive integer greater than or equal to 1) frames is 5000 bytes. In a format 2, in addition to the information I2, the MAC CE further includes time information T, which indicates that the data is transmitted or arrives within a period of time indicated by the time information. The information I2 indicates a transmission rate or an amount of the data. Therefore, the MAC CE indicates that the network device will send data to the terminal apparatus within a period of time T. Similarly, for example, the information I2 indicates that a data amount corresponding to N (N is a positive integer greater than or equal to 1) frames is 5000 bytes, then the MAC CE indicates that the network device will transmit a data amount of 5000 bytes to the terminal apparatus within the period of time T. For the format 1, the network device may also indicate the time T to the terminal apparatus. A difference from the format 2 lies in that the network device pre-configures the period of time T for the terminal apparatus by using an RRC message. In a format 3, the data of the terminal apparatus is divided into data of at least one layer. The information I2 includes at least one piece of layer information and at least one information element. Each information element corresponds to one piece of layer information and indicates a status or a data amount of a layer indicated by the layer information. For example, the MAC CE includes information about a first layer and a second layer. An information element 1 indicates that a data amount of the first layer in the N frames is 5000 bytes, and an information element 2 indicates that a data amount of the second layer in the N frames is 3000 bytes. The first layer is a base layer, and the second layer is an enhancement layer. In addition, only two layers are used as an example in the figure. In another implementation, there may be one or at least two layers. Optionally, when the format 3 is used, information indicating the period of time T may also be added to the MAC CE. In addition, the network device may notify the terminal apparatus of a proportion of rates or a proportion of data amounts between layers in advance, and then indicate a rate or a data amount at only one layer in the MAC CE. As such, the terminal apparatus can know a rate or a data amount at another layer. Similarly, two layers are used as an example. Assuming that a proportion of a data amount at the first layer to a data amount at the second layer is 1:3, and the MAC CE indicates that the data amount at the first layer is 1000 bytes, the terminal apparatus may determine that the data amount at the second layer is 3000 bytes or determine that a total data amount is 4000 bytes. Only the data amount is used herein as an example. Other air interface statuses are similar, and details are not described again.

The network device may periodically send the second information I2 to the terminal apparatus. Alternatively, the network device may send the information I2 to the terminal apparatus when an amount stored by the network device exceeds a threshold (including being greater than or equal to the threshold). This can reduce signaling interaction, further improve a processing speed, and reduce a processing delay.

The network device may separately send the information I2 to a plurality of terminal apparatuses. If the network device needs to send the foregoing data to a plurality of terminal apparatuses, the network device may send the information I2 to the plurality of terminal apparatuses in a broadcast or multicast manner; or may separately send the information I2 to each terminal apparatus. In an implementation, a plurality of terminal apparatuses may be classified into one group, and the information I2 is sent to all terminal apparatuses in the group by using a common message. A same group identifier may be allocated to the terminal apparatuses in the group, to receive the information I2.

In the foregoing embodiment, the data D1 is determined by the database server based on the location of the terminal apparatus and the air interface status. In another implementation, the network device may not provide the air interface status to the database server, but the database server generates, based on the location of the terminal apparatus, the data of the location E (denoted as data D2), and sends the data to the network device. Then, the network device generates data D1 by using the data D2 based on the air interface status. For example, the data D2 is divided into several layers. Only data at some layers is transmitted based on the air interface status. The data at some layers is D1. For another example, the data D2 is compressed or converted into data D1 with a lower definition. This is not limited in this embodiment of this application.

Either or both of the foregoing steps S630 and S670 may be performed. In other words, the network device may provide an air interface status or an amount of stored data for the terminal apparatus, and/or provide an air interface status for the database server. In this way, the terminal apparatus can prepare a data processing manner in advance based on the air interface status or the amount of data stored by the network device, to improve data processing efficiency. In addition, in the method shown in FIG. 5, the data of the location E generated by the database server is high-definition video and/or audio data. Because an air interface transmission capacity is limited, not all generated data can be transmitted to the terminal apparatus. However, in this embodiment of this application, the air interface status is notified to the database server, the database server may adjust a data generation algorithm for the location E based on the air interface status, so that an amount of generated data fits in the air interface transmission capability. Alternatively, the database server transmits only a part of generated data to the network device based on the air interface status. This reduces data generation complexity, or effectively utilizes an air interface resource, enhances data processing efficiency, and improves user experience.

In the foregoing embodiment, the database server generates data of the location E by using the stored data (for example, data of the collection points A, B, and C) based on the location E of the terminal apparatus, and sends the data to the terminal apparatus by using the network device. In another embodiment of this application, a function of "generating data of the location E" is implemented by the network device. The database server transmits data collected at reference points (all or some of the collection points) to the network device in advance, and the network device generates the location data of the terminal apparatus based on the location of the terminal apparatus. The location data of the terminal apparatus may be generated in the manner in the foregoing embodiment, that is, generated based on the air interface status. Alternatively, the data may be generated based on the location of the terminal apparatus without considering the air interface status, and then a part of the generated data is transmitted. In other words, this embodiment may be combined with the foregoing embodiment. A difference lies in that the data of the location E is generated by the database server based on the air interface status in the foregoing embodiment, but the data is generated by the network device in this embodiment. For details, refer to the foregoing embodiment, and details are not described herein again.

Further, if the network device further needs data of more reference points, or further data of current reference points, the network device may send a request message to the database server, to obtain the data of more reference points, or obtain more reference data of the current reference points, and then generates further location data of the terminal apparatus.

The terminal apparatus processes (for example, renders) the received data, and displays a video and/or audio to a user by using a display device. The terminal apparatus may adopt the processing manner in the foregoing embodiment, to be specific, predetermining a processing manner based on the air interface status or the amount of data stored by the network device, and then processing the received data in the determined processing manner. Alternatively, the processing manner may be determined when the data is received, which is not limited in this embodiment. In addition, when receiving the location data of the terminal apparatus that is further generated by the network device, the terminal apparatus may update a processing result.

The following is described with reference to the accompanying drawings.

Figure 8:
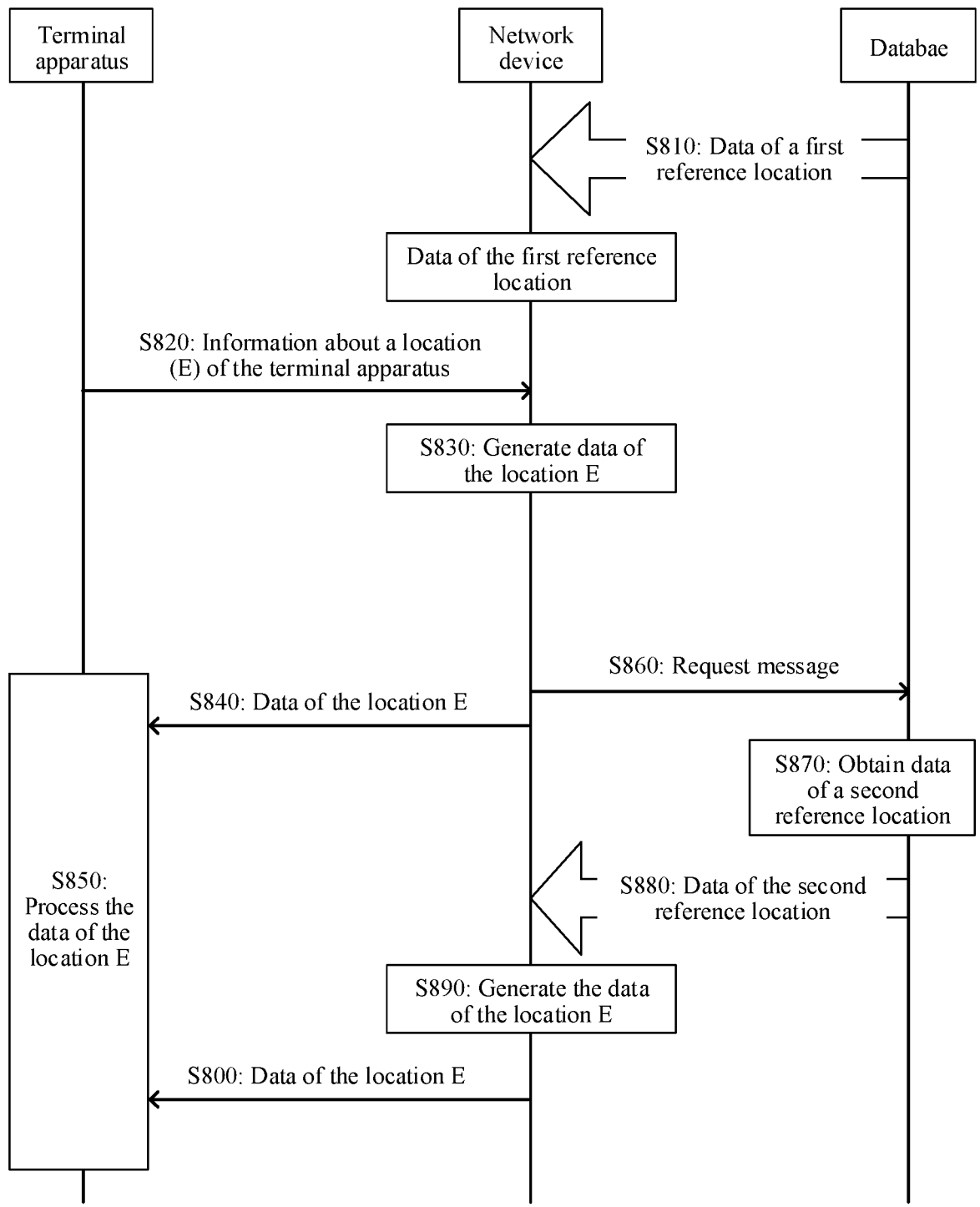
FIG. 8 is a schematic diagram of another communication method according to an embodiment of this application.

FIG. 8 is a schematic diagram of another communication method according to an embodiment of this application. As shown in FIG. 8, the method includes the following steps.

S810: A database server sends data of a first reference location to a network device. The first reference location includes at least one reference point. For example, collection points A, B, and C are reference points herein.

The database server stores data collected at all the collection points, where the collection points A, B, and C are reference points, and the database server stores all data of the reference points A, B, and C. The database server may send all or a part of data of the points A, B, and C to the network device.

The network device receives the data of the first reference location, that is, the data of the points A, B, and C (all or the part of the data of the points A, B, and C that is stored in the database), and stores the received data of the points A, B, and C.

S820: The network device obtains location information of the terminal apparatus, that is, information about a location E.

S830: The network device generates downlink data by using data of the first reference location based on the location of the terminal apparatus, in other words, data to be sent to the terminal apparatus, that is, data of the location E.

The data of the location E may be generated in the manner in the foregoing descriptions, and details are not described herein again.

S840: The network device sends downlink data (that is, the data of the location E) to the terminal apparatus.

The terminal apparatus receives the data of the location E, and performs the following operations:

S850: The terminal apparatus processes downlink data (that is, the data of the location E).

The data of the location E may be processed in the manner in the foregoing descriptions, and details are not described herein again.

Optionally, if the network device determines that precision is currently insufficient and needs data of more reference points, or further data of current reference points, the network device may send a request message to the database server, to obtain the data of more reference locations, or obtain more reference data of the current reference locations, and then generates further data of the location E. In other words, the following operations are performed:

S860: The network device sends the request message to the database server, where the request message requests the data of a second reference location.

The second reference location may be different from or the same as the first reference location. In addition, the second reference location may include or exclude the first reference location.

For example, the request message requests further data of same reference points A, B, and C, or requests data of another reference point D, or requests data of current reference points A, B, and C, and data of another reference point D. The reference point D is used as an example of another reference point. This is not limited in this embodiment of this application, and more reference points such as F and H may be further included.

Optionally, the network device may determine the second reference location based on location information of the terminal apparatus. Alternatively, the network device may send the location information of the terminal apparatus to the database server, and the database server determines the second reference location. In this case, the foregoing request message may include the location information of the terminal apparatus.

Herein is an example in which the database server determines the second reference location and that the second reference locations are reference points A, B, C, and D. As shown in FIG. 8, the foregoing method further includes:

S870: The database server obtains data of the second reference location.

For example, the database server determines the second reference location, such as the reference points A, B, C, or D, based on the location of the terminal apparatus, and obtains the data of the second reference location.

S880: The database server sends data of the second reference location to the network device, for example, sends data of the reference points A, B, C, and D.

The network device receives the data of the second reference location, and performs the following operations:

S890: The network device further generates downlink data, that is, the data of the location E, by using data of the second reference location based on the location of the terminal apparatus.

The data of the location E may be generated in the manner in the foregoing descriptions, and details are not described herein again.

S800: The network device sends further generated downlink data (that is, the data of the location E) to the terminal apparatus.

The terminal apparatus repeats the foregoing step S850 to process the further received downlink data, or combines the downlink data in steps S840 and S800, and processes the combined data.

In the foregoing step S810, the database server sends the data of the first reference location to the network server. The first reference location may be determined in different manners. The following provides examples of several implementations with reference to the accompanying drawings.

Figure 9:
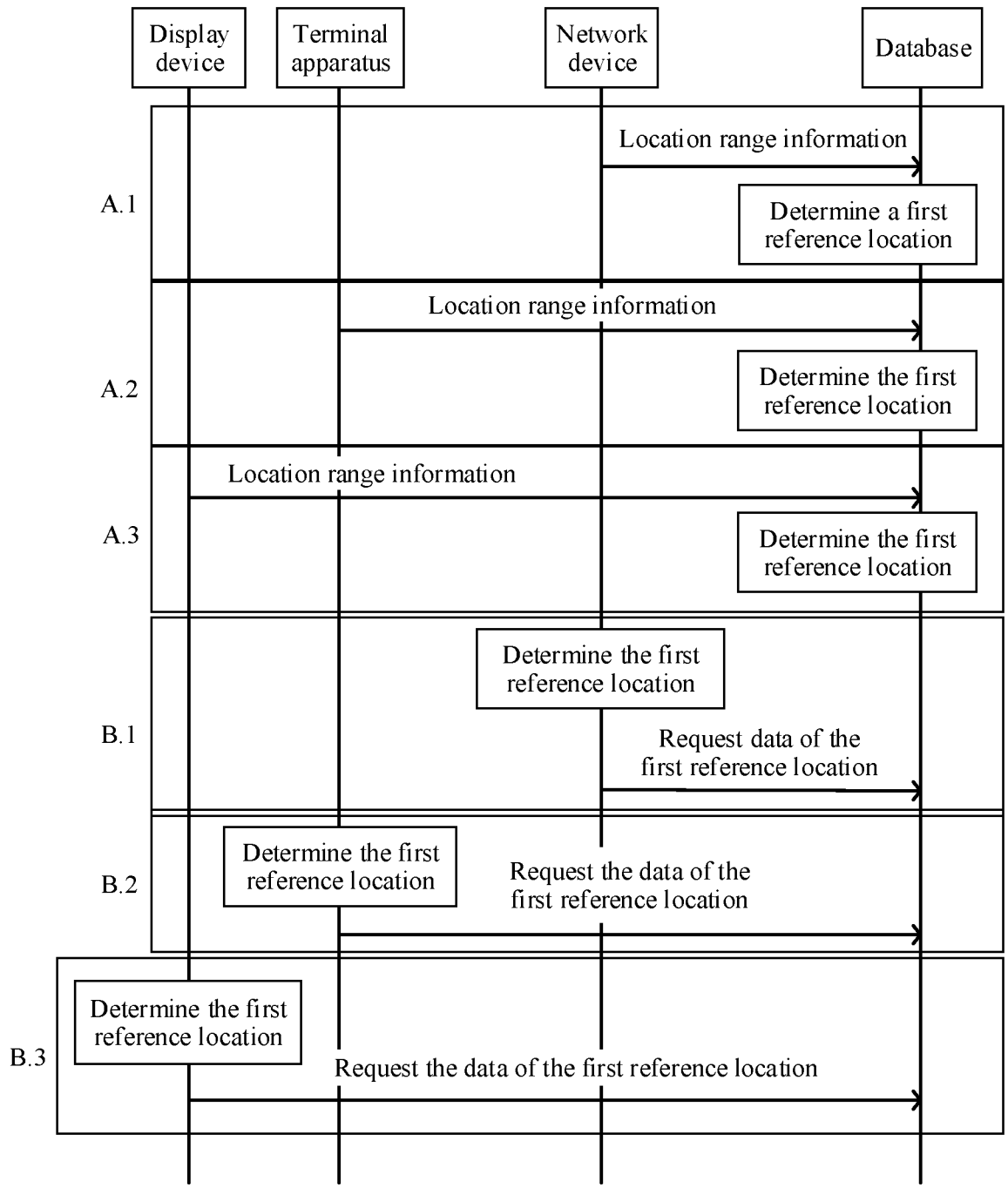
FIG. 9 is a schematic diagram of a method for determining a first reference location according to an embodiment of this application.

FIG. 9 is a schematic diagram of a method for determining a first reference location according to an embodiment of this application.

In a first implementation (for example, A1 in FIG. 9), a network device determines a possible location range of a terminal apparatus based on location information previously reported by the terminal apparatus (referred to as historical location information), and indicates the possible location range of the terminal apparatus to a database server. The location range is represented, for example, by using three-dimensional coordinate values and a radius value, which means that the terminal apparatus may be located in a range of a virtual sphere. A center of the virtual sphere is determined by using the three-dimensional coordinate values, and the radius is predicted by the network device. In this case, the foregoing method further includes: The network device reports location range information to the database server. The location range information indicates a location range of the terminal apparatus. The data server determines the first reference location based on the location range information. The location range information includes information about coordinates of a central location of the terminal apparatus and information about a radius of the location range. In addition, the network device may further send focal angle information to the database server. The focal angle indicates focal length, for example, a close shot or a long shot. In the foregoing embodiment, the field of view information indicates a range of a user's field of view, and the focusing angle indicates a depth of field. It is assumed that the user's field of view remains unchanged, but a focused object changes, for example, from a near scenery to a distant scenery.

In a second implementation (for example, A2 in FIG. 9), the terminal apparatus provides the location range information of the terminal apparatus to the network device, and the network device transparently transmits or parses and transmits the information to the database server. The location range information is the same as that in the first implementation, and details are not described herein again. Similarly, the terminal apparatus may further provide the focal angle information to the database server.

In a third implementation (for example, A3 in FIG. 9), the display device provides the location range information of the terminal apparatus for the network device, the terminal apparatus and the network device transparently transmit or parses the information, and then the information is transmitted to the database server. Alternatively, the display device directly transmits such information to the network device, and the network device transmits the information to the database server after transparent transmission or parsing. The location range information is the same as that in the first implementation, and details are not described herein again. Similarly, the display device may further provide focal angle information to the database server.

In the foregoing implementation, the database server determines the first reference location. In addition, the network device, the terminal apparatus, or the display device may determine the first reference location, and request the data of the first reference location from the database server. Still refer to FIG. 9.

In a fourth implementation (for example, B1 in FIG. 9), the network device determines the first reference location, in other words, requests data of a specific reference point from the database server, and requests the data of the first reference location from the database server. In this case, the foregoing method further includes: The network device determines the first reference location, and requests the data of the first reference location from the database server. For example, the first reference location includes reference points A, B, C, and D shown in the figure. The data of the first reference location may be requested from the database server by sending information about the first reference location, for example, information about A, B, C, and D, to the database server. All collection points may be indexed, and the information about the first reference location may include indexes of the reference points A, B, C, and D. Similarly, the network device may further provide the focal angle information to the database server.

A fifth implementation (for example, B2 in FIG. 9) is similar to the fourth implementation. A difference lies in that the terminal apparatus determines the first reference location, and transparently transmits the information about the first reference location to the database server by using a network device. Similarly, the terminal apparatus may further provide the focal angle information to the database server.

A sixth implementation (for example, B3 in FIG. 9) is similar to the fourth implementation, and a difference lies in that the display device determines the first reference location, and transparently transmits the information about the first reference location to the database server by using the network device, or transparently transmits the information about the first reference location to the database server by using the terminal apparatus and the network device. Similarly, the display device may further provide the focal angle information to the database server.

According to any one of the foregoing implementations, the database server may provide the data of the first reference location to the network device in advance. In addition, the data server may further provide additional data to the network device, for example, data of another collection point or data of another focal angle. This is not limited in this embodiment of this application.

Steps after S810 in FIG. 8 have a high requirement on real-time performance. Therefore, after storing the data of the first reference location, if the network device receives the location information of the terminal apparatus, the network device generates data of the location of the terminal apparatus (that is, data of a location E), and sends the data to the terminal apparatus, so that the terminal apparatus starts a rendering process. If the network device considers that stored data is insufficient to generate time-frequency data and/or audio data of the location of the terminal apparatus, the network device may further request data of the second reference location from the database server. While executing the rendering process, the terminal apparatus is waiting for the location data of the terminal apparatus (that is, the data of the location E) that is further sent by the network device. When receiving the location data of the terminal apparatus that is further sent by the network device, the terminal apparatus completes rendering, and displays the data to a user by using a display device.

In the foregoing processes, when the stored data is insufficient to generate the time-frequency data and/or the audio data of the location of the terminal apparatus, the network device still generates and transmits a part of data first. In this way, the terminal apparatus may prepare for rendering according to the data, and wait until further data arrives. This allows a quicker completion of rendering processing, and improves data processing efficiency.

In another case, the data stored by the network device is sufficient to generate the time-frequency data and/or the audio data of the location of the terminal apparatus, but a current air interface status is insufficient to transmit so much data within a short period of time. As such, in combination with the foregoing embodiment, the data of the location E may be generated in any implementation described in the foregoing embodiment. For example, the generated data is layered by priorities, or multi-layer data of different priorities is generated, and then data of a layer or layers is to be transmitted is determined based on the air interface status. The data at a layer with a higher priority is preferentially transmitted. For another example, an amount or a generation manner of generated data is determined based on the air interface status and the amount of data stored by the network device. For example, a higher data transmission rate indicates more generated data; otherwise indicates less generated data. In addition, the air interface status or the amount of stored data may be notified to the terminal apparatus before data transmission, so that the terminal apparatus prepares for data processing in advance. For details, refer to the foregoing embodiment, and details are not described herein again.

In the foregoing embodiment, the data provided by the data server for the network device and the data provided by the network device to the terminal apparatus are quite different in content and data amount. In a conventional technology, a core network collects statistics about traffic consumed by a terminal apparatus, and performs charging. In this way, the charging method is inconsistent with actual air interface consumption. Therefore, in this embodiment of this application, after transmitting data to the terminal apparatus, the network device may report an amount of data transmitted on the air interface to a charging apparatus of the core network. After receiving the data amount reported by the network device, the charging apparatus collects statistics about the amount of the data transmitted on the air interface by the terminal apparatus, and performs charging. In this way, charging is more proper.

In the figure, connections between the network device and the data server and between the database server and the data collection apparatus are displayed by using straight lines for simplicity, but the connections may pass a plurality of routers, gateways, and the like. For example, the network device and the database server may be connected by using a core network device, or another network element. This is not limited in this embodiment of this application.

In the foregoing embodiment, the database server or the network device generates the data of the location E based on a location E of the terminal apparatus. In another embodiment of this application, the function of "generating the data of the location E" is implemented by the terminal apparatus. A difference from the embodiment shown in FIG. 8 lies in that the data of the first reference location is further sent by the network device to the terminal apparatus, and the terminal apparatus generates the data of the location E based on the data of the first reference location. Further requesting the data of the second reference location may be initiated by the network device or the terminal apparatus.

Figure 10:
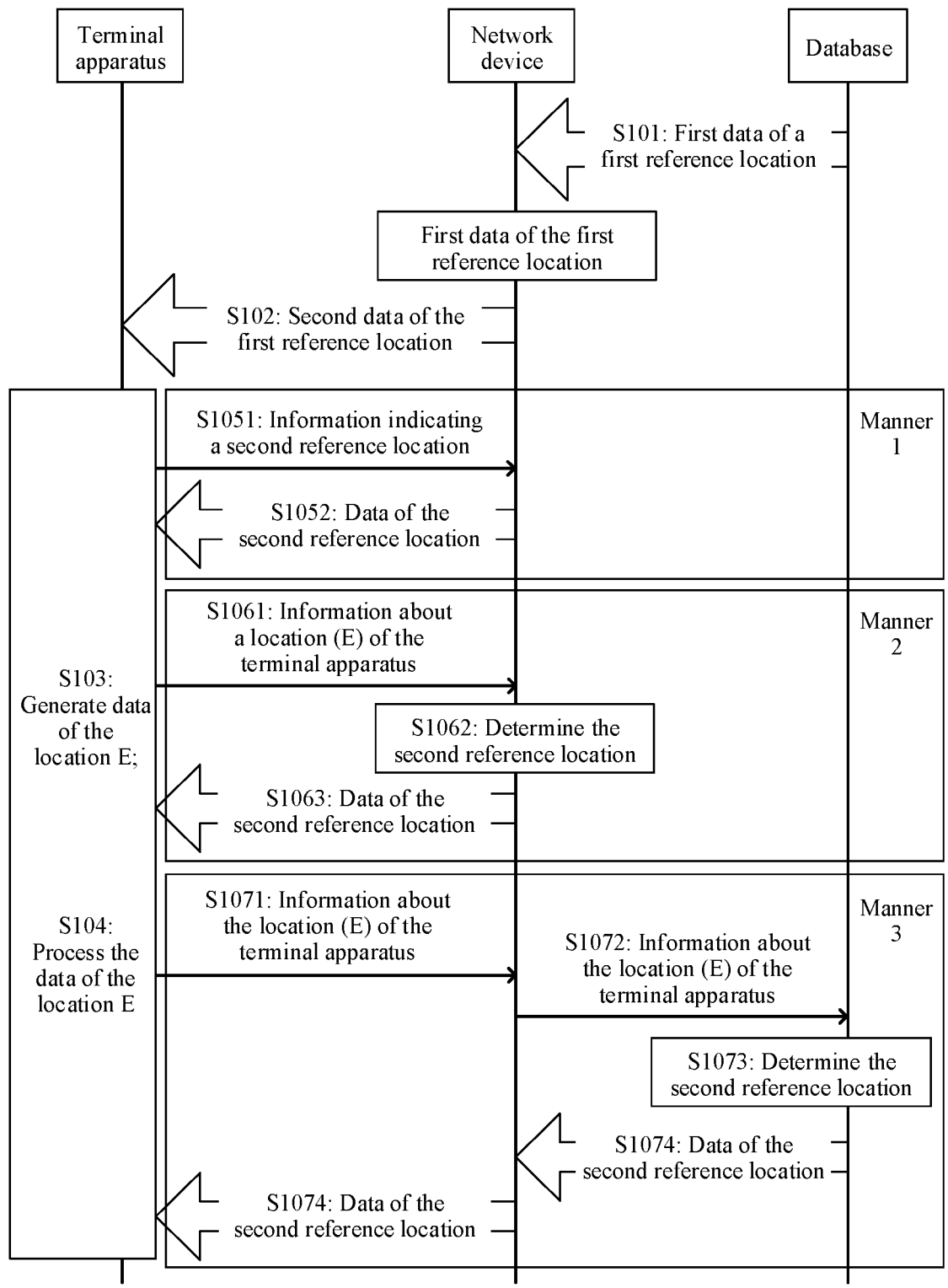
FIG. 10 is a schematic diagram of another communication method according to an embodiment of this application.

The following provides description with reference to FIG. 10.

FIG. 10 is a schematic diagram of another communication method according to an embodiment of this application. As shown in FIG. 10, the method includes the following steps.

S101: A database server sends first data of a first reference location to a network device. The first reference location includes at least one reference point. For example, collection points A, B, and C are reference points herein.

The network device receives the first data of the first reference location. The first data of the first reference location that is sent by the database server to the network device may be all or a part of data of the first reference location stored in the server.

For example, the first reference location includes reference points A, B, and C. The database server stores data of the reference points A, B, and C, and the database server may send all or a part of the data of the reference points A, B, and C to the network device.

S102: The network device sends second data of the first reference location to a terminal apparatus, where the second data includes all or a part of the first data.

The network device may send all or a part of the received first data of the first reference location to the terminal apparatus. For example, when an air interface status does not allow sending all of the first data of the first reference location, the network device sends the part of the first data of the first reference locations to the terminal apparatus.

The terminal apparatus receives the second data of the first reference location from the network device, and stores the second data.

S103: The terminal apparatus generates, based on a location of the terminal apparatus, location data of the terminal apparatus, that is, data of a location E, by using the second data of the first reference location.

S104: The terminal apparatus further processes the data of the location E, and provides the data to a display device for displaying to a user.

In the foregoing processes, the database server may transmit all or the part of the stored data of the first reference location to the network device. A specific transmission amount may be determined based on a capability of a transmission channel between the database server and the network device. The network device may transmit all or the part of the received first data of the first reference location to the terminal apparatus, and a specific transmission amount may be determined based on the air interface status.

When generating the data of the location E, if the terminal apparatus considers that currently stored information about the second data of the first reference location is insufficient to achieve required precision, the terminal apparatus may request more information from the network device, for example, information about the second reference location. The second reference location may be different from or the same as the first reference location. In addition, the second reference location may include the first reference location or a reference point other than the first reference location.

In this case, the foregoing method further includes:

The terminal apparatus sends a first request message to the network device, where the first request message requests data of the second reference location.

In an implementation (as shown in a manner 1 in the figure), the terminal apparatus determines the second reference location based on the location of the terminal apparatus, and indicates the second reference location in the first request message. In other words, the first request message includes information indicating the second reference location (S1051). The network device determines the second reference location based on the information indicating the second reference location, and sends stored data of the second reference location to the terminal apparatus (S1052). If the database server provides both the data of the first reference location and the data of the second reference location in the foregoing step S101, the network device may send all or a part of the stored data of the second reference location to the terminal apparatus. If the network device did not store the data of the second reference location or the stored data of the second reference location is insufficient, the network device may further request the data of the second reference location from the database server. For example, the network device indicates the second reference location to the database server, so that the database server provides all or a part of data of the second reference location that is stored by the database server to the network device based on the second reference location. For another example, the network device determines that the network device has stored data of some reference points of the second reference location, and requests data of other reference points from the database server, and the second reference location includes reference points A, B, C, and D. Assuming that the network device has stored data of the reference points A, B, and C, the network device requests data of the reference point D from the database server, and the database server sends all or a part of the stored data of the reference point D to the network device.

In another implementation (as shown in a manner 2 in the figure), the terminal apparatus sends location information of the terminal apparatus to the network device (S1061), and the network device determines the second reference location based on the location information of the terminal apparatus (S1062), and sends the stored data of the second reference location to the terminal apparatus (S1063). If the database server provides both the data of the first reference location and the data of the second reference location in the foregoing step S910, the network device may send all or a part of the stored data of the second reference location to the terminal apparatus. If the network device did not store the data of the second reference location or the stored data of the second reference location is insufficient, the network device may further request the data of the second reference location from the database server. There may be a plurality of request manners. For example, the network device indicates the second reference location to the database server, so that the database server provides all or a part of data of the second reference location that is stored by the database server to the network device based on the second reference location. For another example, the network device sends the location information of the terminal apparatus to the database server, so that the database server determines the second reference location based on the location information of the terminal apparatus, and provides all or the part of the data of the second reference location that is stored by the database server to the network device. For another example, the network device determines that the network device has stored data of some reference points of the second reference location, and requests data of other reference points from the database server, and the second reference location includes reference points A, B, C, and D. Assuming that the network device has stored data of the reference points A, B, and C, the network device requests data of the reference point D from the database server, and the database server sends all or a part of the stored data of the reference point D to the network device.

In still another implementation (as shown in a manner 3 in the figure), the terminal apparatus sends the location information of the terminal apparatus to the network device (S1071), and the network device sends the location information of the terminal apparatus to the database server (S1072). The network device may transparently transmit the location information of the terminal apparatus. In this case, the network device does not know the location of the terminal apparatus. Alternatively, the network device may parse and transmit the location information to the data server. In this case, the network device may know the location of the terminal apparatus. The database server determines the second reference location based on the location information of the terminal apparatus (S1073), and provides all or the part of the data of the second reference location that is stored by the database server to the network device (S1074) based on the second reference location.

The location information of the terminal apparatus is the same as that in the foregoing embodiment, and details are not described herein again.

The foregoing manners may be used in combination. For example, when the latter manner is combined, the terminal apparatus provides the location information of the terminal apparatus to the network device, and the network device further provides the location information to the database server. In this way, both the network device and the database server can determine to continuously supplement data of the reference location that meets a precision requirement, to improve user experience and data processing efficiency. For example, the network device generates a part of the location data of the terminal apparatus by using the stored data based on the location information of the terminal apparatus, and provides the data to the terminal apparatus. The terminal apparatus may first process the data. In addition, the database server generates another part of location data of the terminal apparatus by using the stored data based on the location information of the terminal apparatus, and provides the data to the terminal apparatus. The terminal apparatus may further update the received data, further process the data, and provide the data to the display device for displaying to a user.

In the foregoing embodiment, the network device determines the data to be transmitted to the terminal apparatus based on the air interface status, but does not consider a situation of the terminal apparatus, for example, the terminal apparatus is overheated or has low power. In this case, a processing capability of the terminal apparatus may be reduced. Therefore, in this embodiment of this application, the terminal apparatus reports status information of the terminal apparatus to the network device, and the network device adjusts an amount of the data transmitted to the terminal apparatus based on the status information while ensuring that user experience is not affected.

Figure 11:
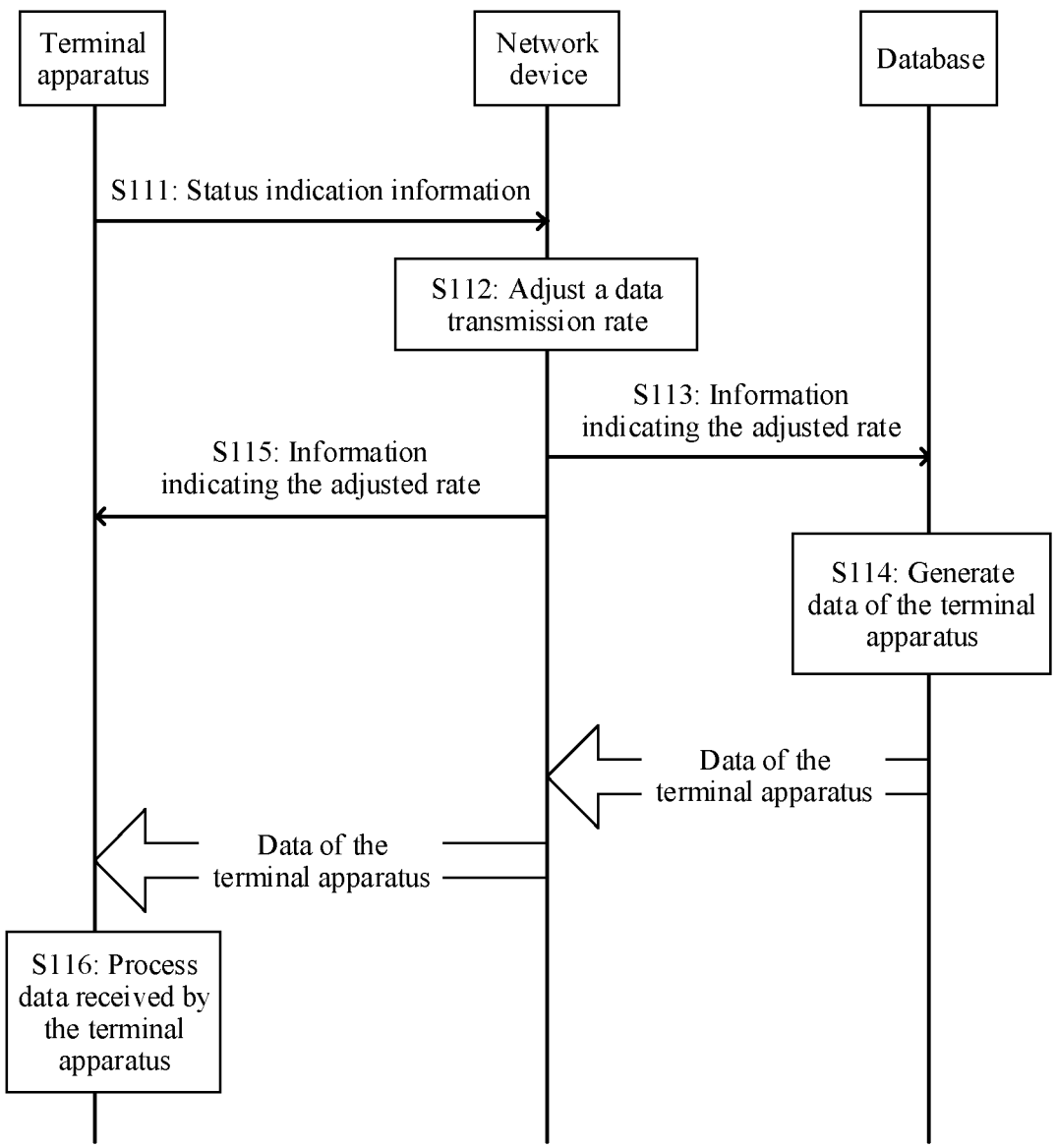
FIG. 11 is a schematic diagram of still another communication method according to an embodiment of this application.

The following is described with reference to the accompanying drawings. FIG. 11 is a schematic diagram of still another communication method according to an embodiment of this application. As shown in FIG. 11, the method includes the following steps.

S111: A terminal apparatus sends status indication information to a network device, where the status indication information indicates a status of the terminal apparatus. The network device receives the status indication information.

The terminal apparatus sends the status indication information to the network device based on the status of the terminal apparatus. The status of the terminal apparatus includes one or more of the following statuses: a battery level, processor usage, memory usage, heat, and the like. The heat is heat measured by the heat sensor.

A battery level is used as an example. When the battery level of the terminal apparatus is less than or equal to a preset value, the terminal apparatus sends a low battery level indication to the network device. Processor usage or memory usage is used as an example. When the processor usage or the memory usage of the terminal apparatus is higher than or equal to a preset value, the terminal apparatus sends a high usage indication to the network device. Heat is used as an example. When the heat of the terminal apparatus is greater than or equal to a preset value, the terminal apparatus sends a high heat indication to the network device.

Optionally, the terminal apparatus may indicate a recommended rate to the network device. In other words, in addition to the status indication information, the terminal apparatus further sends rate indication information to the network device. The rate indication information indicates a data transmission rate or a decrease value of the data transmission rate recommended by the terminal apparatus. In this way, the network device adjusts the data transmission rate to the terminal apparatus based on the received rate indication information. The status indication information and the rate indication information may be sent simultaneously, for example, carried in a same message. Alternatively, the terminal apparatus may send only the rate indication information, and the network device directly adjusts the data transmission rate to the terminal apparatus based on the rate indication information.

To reduce usage of air interface resources, several alternative rates may be preset. Each rate is indicated by an index value. Then the rate indication information may be an index value of one rate.

S112: The network device adjusts the data transmission rate to the terminal apparatus based on the status indication information.

For example, when the network device receives the status indication information, the network device reduces the data transmission rate to the terminal apparatus. In an implementation, a step value of the rate decrease may be set. When the status indication information is received, the rate is decreased by one step value. When the status indication information is received again, the rate is further decreased by one step value. Similar operations may be continuously performed. In another implementation, a preset value may be set, and when the status indication information is received, a rate may be decreased to the preset value. In still another implementation, the network device adjusts the data transmission rate to the terminal apparatus based on the received rate indication information.

Further, the network device may notify the database server and/or the terminal apparatus of the adjusted rate. Similar to the description of the embodiment shown in FIG. 6, the network device may notify the database server and/or the terminal apparatus of the adjusted air interface status. In this way, the database server may adjust an algorithm for generating the location data of the terminal apparatus based on the adjusted rate, and reduce an amount of generated data, to adapt to a reduced rate. The terminal apparatus may adjust a data processing manner based on the adjusted rate, for example, adjust a rendering algorithm, and perform deep rendering on the received data, to reduce an impact on a user.

In this case, the foregoing method further includes:

S113: The network device sends information indicating the adjusted rate to the database server. The database server receives the information indicating the adjusted rate.

S114: The database server generates data of the terminal apparatus based on the adjusted rate, and sends the data of the terminal apparatus to the network device, so that the data is sent to the terminal apparatus by using the network device.

S115: The network device sends the information indicating the adjusted rate to the terminal apparatus.

When the terminal apparatus receives the adjusted rate recommend by the network device, the network device may skip step S103, and the terminal apparatus may adjust the data processing manner based on the recommended rate.

S116: The terminal apparatus processes the data received by the terminal apparatus based on the adjusted rate.

The data processed in step S116 may be the data generated in step S114, or a part of the data generated in step S114, or the data received by the terminal apparatus before or after step S114. This is not limited in this embodiment of this application.

Figure 12:
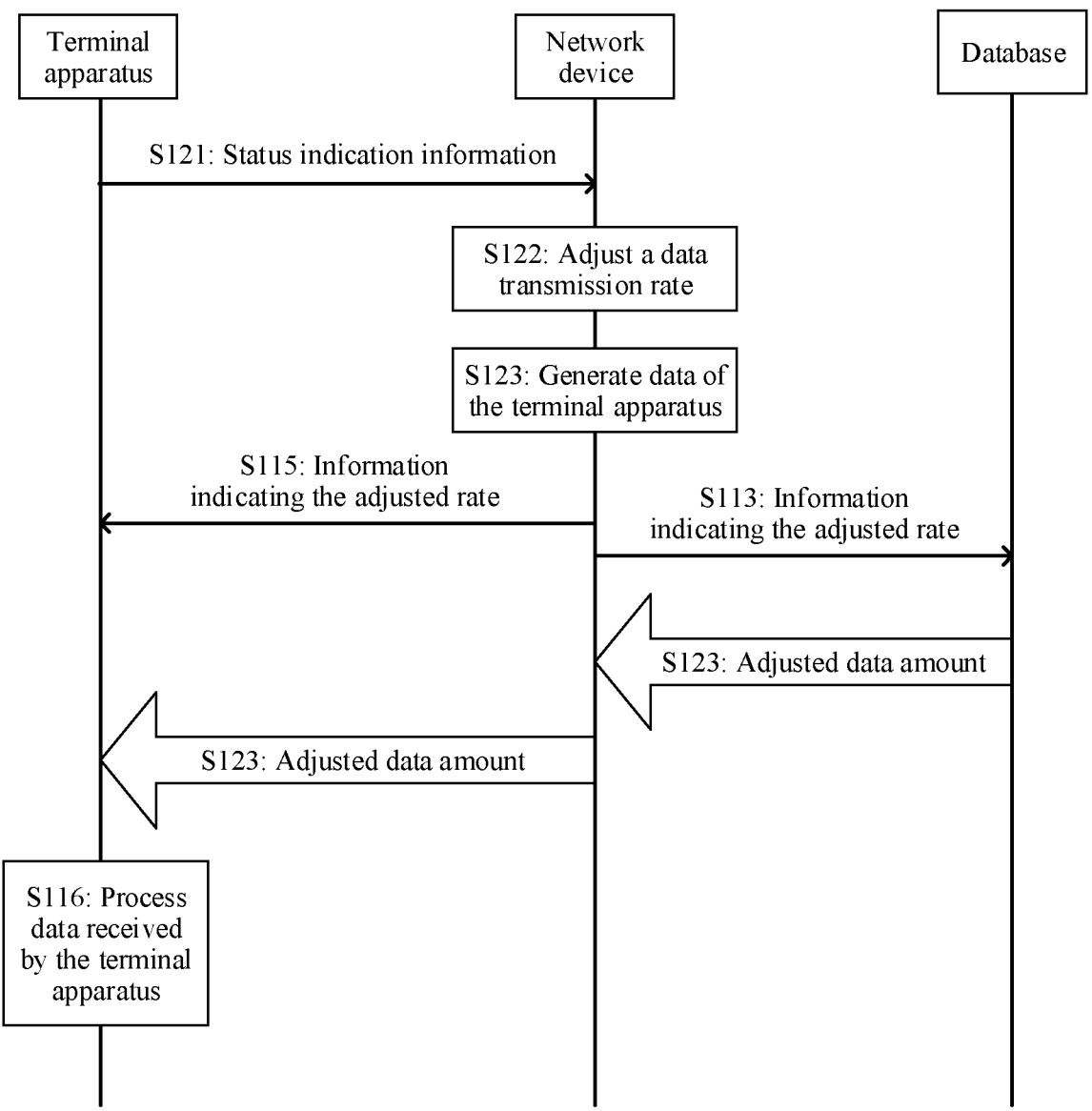
FIG. 12 is a schematic diagram of still another communication method according to an embodiment of this application.

As described in the foregoing embodiment, the location data of the terminal apparatus may be generated by the database server or the network device. If the data is generated by the network device, another communication method provided in an embodiment of this application is shown in FIG. 12. The method includes the following steps.

S121: The terminal apparatus sends status indication information to the network device, where the status indication information indicates a status of the terminal apparatus. The network device receives the status indication information.

Implementation of step S121 is the same as that of step S111, and the terminal apparatus may further send rate indication information, or the status indication information may be replaced with the rate indication information.

S122: The network device adjusts a data transmission rate to the terminal apparatus based on the status indication information.

S123: The network device generates data of the terminal apparatus based on the adjusted rate.

In addition, the network device may also perform either or both of the foregoing steps S113 and S115, and then the terminal apparatus may perform step S116.

Optionally, the foregoing step S113 may be replaced with that the network device sends reference frame requirement information to a database server. The reference frame requirement information indicates a cycle of sending the reference frame by the database server. In this way, the database server may periodically send the reference frame based on the reference frame requirement information. The reference frame is a frame that can be independently decoded by a receiver without referring to another frame. If an air interface status is poor, the network device may request more frequent transmission of the reference frame. The network device may also request the database server to send all reference frames once, or may send the reference frame on each request.

The database server performs the following operations based on the received information indicating the adjusted rate or the received reference frame requirement information.

S123: The database server decreases an amount of data sent to the network device based on the information indicating the adjusted rate or the reference frame requirement information, or decreases a data amount of the reference frame sent to the network device, that is, sends the adjusted data amount to the network device.

Similarly, the data processed in the foregoing step S116 may be data generated in step S123, or may be data received by the terminal apparatus before or after step S123. This is not limited in this embodiment of this application.

Figure 13:
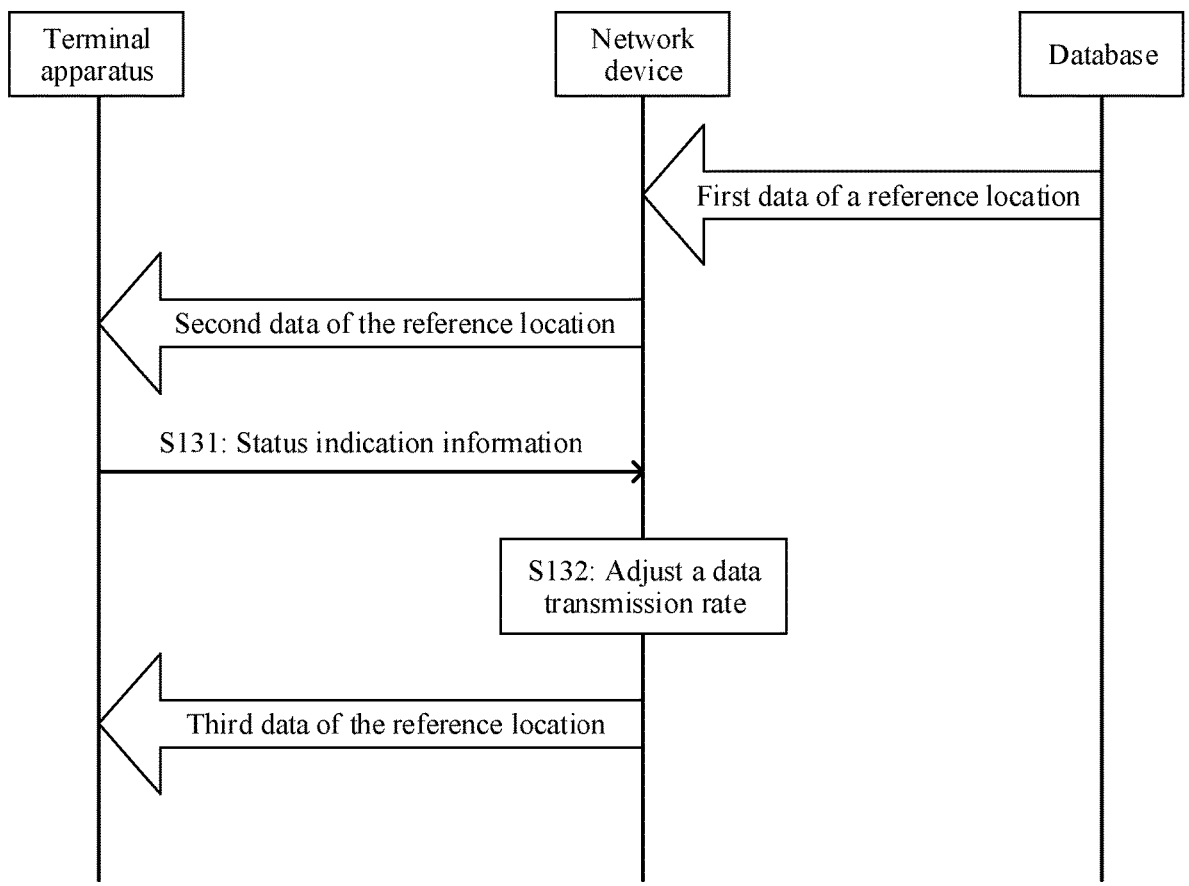
FIG. 13 is a schematic diagram of still another communication method according to an embodiment of this application.

As described in the foregoing embodiment, the location data of the terminal apparatus may be generated by the terminal apparatus. If the location data is generated by the terminal apparatus, another communication method provided in this embodiment of this application is shown in FIG. 13. The method includes the following steps.

S131: The terminal apparatus sends status indication information to a network device, where the status indication information indicates a status of the terminal apparatus. The network device receives the status indication information.

Implementation of step S131 is the same as that of step S111. The terminal apparatus may further send rate indication information, or the status indication information may be replaced with the rate indication information.

S132. The network device adjusts a data transmission rate to the terminal apparatus based on an adjusted rate.

Different from the embodiment shown in FIG. 11, the data transmitted to the terminal apparatus is not the location data of the terminal apparatus, but data of a reference location. A process of obtaining the data of the reference location is the same as that in the foregoing embodiment, and details are not described herein again.

In addition, a reference location may be the same or different before and after the adjustment. For example, the reference location before the adjustment is a first reference location in the foregoing embodiment, and the reference location after the adjustment is the first reference location or a second reference location in the foregoing embodiment. For another example, the reference location before and after the adjustment is the second reference location in the foregoing embodiment.

In addition, the network device may also perform either or both of the foregoing steps S113 and S115, and then the terminal apparatus may perform step S116.

In the foregoing embodiments, the data processing, for example, rendering, performed by the terminal apparatus may be performed in the display device. In this case, the terminal apparatus provides the received data to the display device, and the display device processes and displays the data. The display device herein may be understood as a terminal apparatus.

An embodiment of this application further provides an apparatus for implementing any one of the foregoing methods, for example, a communications apparatus including a unit (or means) configured to implement the steps performed by the terminal apparatus in any one of the foregoing methods. For another example, another communications apparatus is further provided, including a unit (or means) configured to implement the steps performed by the network device in any one of the foregoing methods. For another example, another communications apparatus is further provided, including a unit (or means) configured to implement the steps performed by the database server in any one of the foregoing methods.

Figure 14:
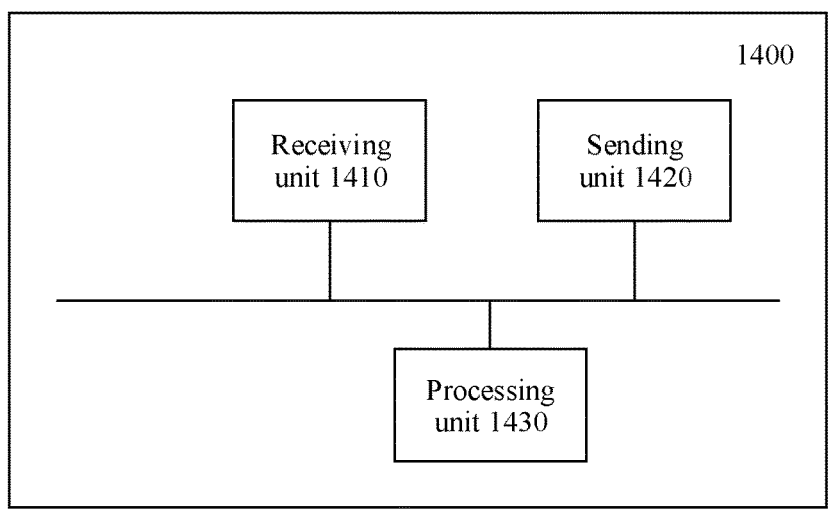
FIG. 14 is a schematic diagram of a communications apparatus according to an embodiment of this application.

For example, FIG. 14 is a schematic diagram of a communications apparatus according to an embodiment of this application. The apparatus is used in a terminal apparatus, and is configured to perform any method performed by the terminal apparatus in any one of the foregoing embodiments. As shown in FIG. 14, the apparatus 1400 includes a receiving unit 1410, a sending unit 1420, and a processing unit 1430. The receiving unit 1410 is configured to receive, from the network device, information sent by any network device to the terminal apparatus in any one of the foregoing embodiments. The sending unit 1420 is configured to send any type of information sent by the terminal apparatus to the network device in any one of the foregoing embodiments. When the receiving unit 1410 receives information indicating an air interface status or an amount of data stored by the network device, the processing unit 1430 processes data based on the air interface status or the amount of data stored by the network device.

Other operations of the terminal apparatus are the same as those in the foregoing embodiment, and details are not described herein again.

Figure 15:
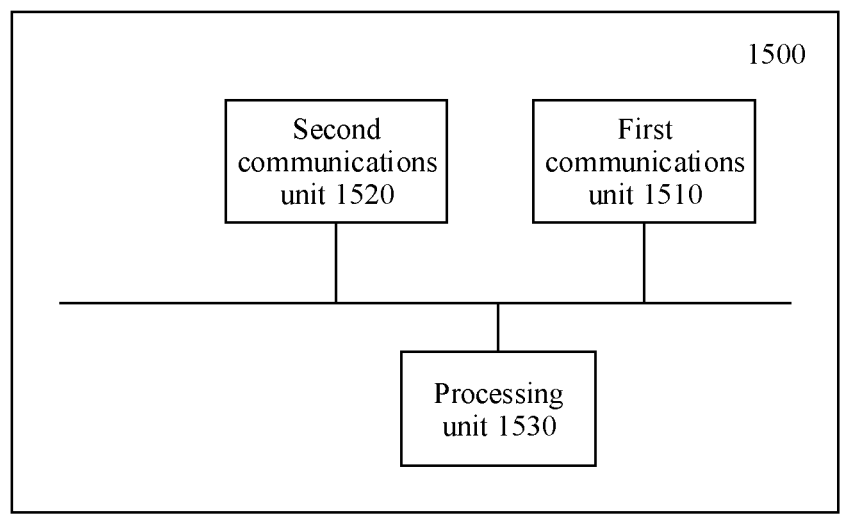
FIG. 15 is a schematic diagram of another communications apparatus according to an embodiment of this application.

For example, FIG. 15 is a schematic diagram of another communications apparatus according to an embodiment of this application. The apparatus is used in a network device, and is configured to perform any method performed by the network device in any one of the foregoing embodiments. As shown in FIG. 15, the apparatus 1500 includes a first communications unit 1510, a second communications unit 1520, and a processing unit 1530. The first communications unit 1510 is configured to communicate with a terminal apparatus, receive data or information from the terminal apparatus, or send data or information to the terminal apparatus. The first communications unit 1520 is configured to communicate with a database server, receive data or information from the database server, or send data or information to the database server. The processing unit 1530 is configured to perform an operation other than receiving and sending, for example, determining an air interface status or an amount of stored data.

A timer that is running includes at least one of a first timer, a second timer, and a third timer. Descriptions about the timers are the same as those in the foregoing method embodiment, and details are not described again.

Other operations of the network device are the same as those in the foregoing embodiment, and details are not described herein again.

Figure 16:
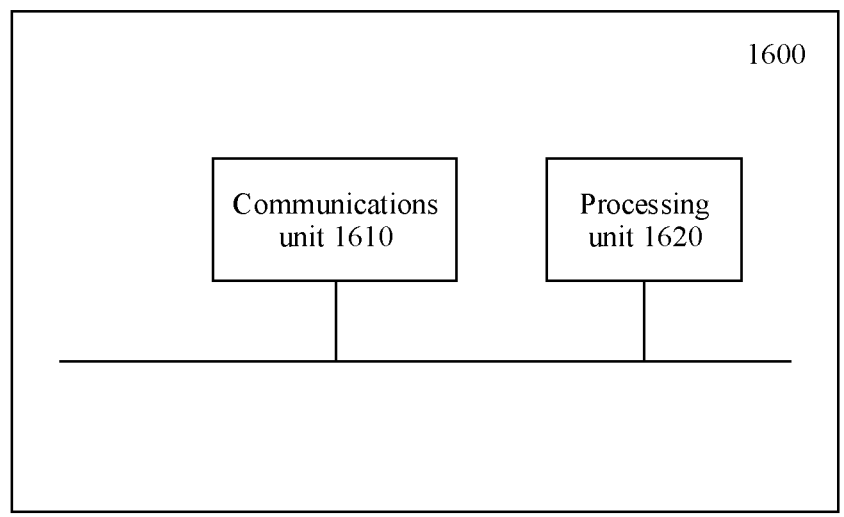
FIG. 16 is a schematic diagram of still another communications apparatus according to an embodiment of this application.

For example, FIG. 16 is a schematic diagram of still another communications apparatus according to an embodiment of this application. The apparatus is used in a database server, and is configured to perform any method performed by the database server in any one of the foregoing embodiments. As shown in FIG. 16, the apparatus 1600 includes a communications unit 1610 and a processing unit 1620. The communications unit 1610 is configured to communicate with a network device, receive data or information from the network device, or send data or information to the network device. The processing unit 1620 is configured to perform an operation other than receiving and sending, for example, generating data based on an air interface status and a location of a terminal apparatus.

It should be understood that division of the foregoing apparatus into the units is merely logical function division. In an actual implementation, all or some of the units may be integrated into a physical entity, or may be physically separate. In addition, all the units in the apparatus may be implemented in a form of software invoked by a processing element, or may be implemented in a form of hardware. Alternatively, some units may be implemented in a form of software invoked by a processing element, and some units may be implemented in a form of hardware. For example, the units may be separately disposed processing elements, or may be integrated into a chip of the apparatus for implementation. In addition, the units may be stored in a memory in a program form, and is invoked by a processing element of the apparatus to perform functions of the units. In addition, all or some of the units may be integrated or may be implemented separately. The processing element herein may also be referred to as a processor, and may be an integrated circuit having a signal processing capability. In an implementation process, the steps in the foregoing method or the foregoing units may be implemented by using a hardware integrated logic circuit in the processor element, or may be implemented in a form of software invoked by the processing element.

For example, a unit in any one of the foregoing apparatuses may be one or more integrated circuits configured to implement the foregoing method, for example, one or more application-specific integrated circuits (ASICs), one or more microprocessors (DSPs), one or more field programmable gate arrays (FPGAs), or a combination of at least two of the integrated circuits. For another example, when the units in the apparatus may be implemented in a form of scheduling a program by a processing element, the processing element may be a general-purpose processor, for example, a central processing unit (CPU) or another processor that can invoke a program. For still another example, the units may be integrated and implemented in a form of a system-on-a-chip (SOC).

The foregoing receiving unit is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 17:
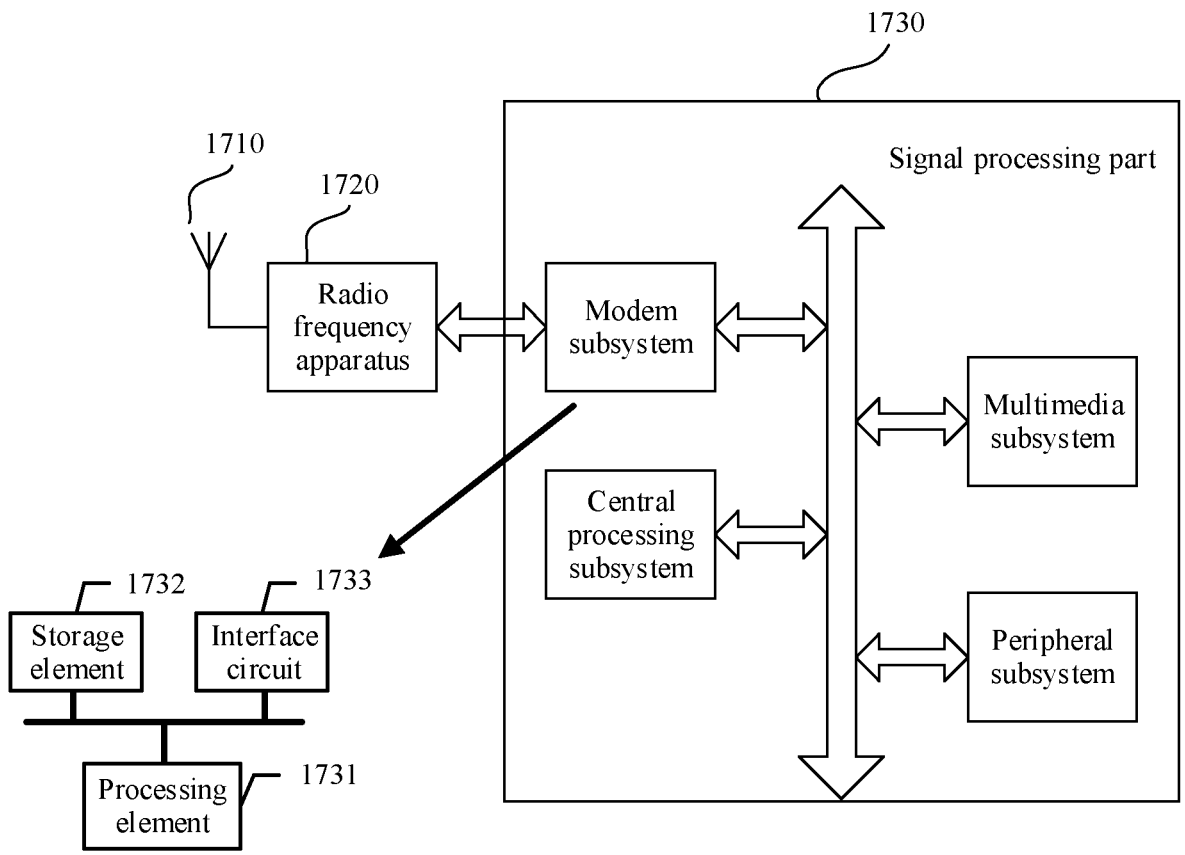
FIG. 17 is a schematic diagram of a structure of a terminal according to an embodiment of this application.

FIG. 17 is a schematic diagram of a structure of a terminal according to an embodiment of this application. The terminal apparatus in the foregoing embodiment may be located in the terminal or may be the terminal, configured to implement an operation of the terminal apparatus in the foregoing embodiment. As shown in FIG. 17, the terminal includes an antenna 1710, a radio frequency part 1720, and a signal processing part 1730. The antenna 1710 is connected to the radio frequency part 1720. In a downlink direction, the radio frequency part 1720 receives information sent by a network device by using the antenna 1710, and sends the information sent by the network device to the signal processing part 1730 for processing. In an uplink direction, the signal processing part 1730 processes information about the terminal, and sends the information to the radio frequency part 1720. The radio frequency part 1720 processes the information about the terminal, and then sends processed information to the network device by using the antenna 1710.

The signal processing part 1730 may include a modem subsystem, configured to process data at each communication protocol layer. The signal processing part 1730 may further include a central processing subsystem, configured to process an operating system and an application layer of the terminal. In addition, the signal processing part 1730 may further include another subsystem, for example, a multimedia subsystem or a peripheral subsystem. The multimedia subsystem is configured to control a camera, a screen display, and the like of the terminal. The peripheral subsystem is configured to implement a connection to another device. The modem subsystem may be a chip that is separately disposed. Optionally, the foregoing apparatus used in the terminal may be located in the modem subsystem.

The modem subsystem may include one or more processing elements 1731, for example, include a main control CPU and another integrated circuit. In addition, the modem subsystem may further include a storage element 1732 and an interface circuit 1733. The storage element 1732 is configured to store data and a program. However, a program used to perform the methods performed by the terminal in the foregoing methods may not be stored in the storage element 1732, but is stored in a memory outside the modem subsystem, and is loaded and used by the modem subsystem when to be used. The interface circuit 1733 is configured to communicate with another subsystem. The foregoing apparatus applied to the terminal may be located in the modem subsystem. The modem subsystem may be implemented by using a chip. The chip includes at least one processing element and an interface circuit. The processing element is configured to perform the steps of any one of the methods performed by the terminal. The interface circuit is configured to communicate with another apparatus. In an implementation, units of the terminal that implement the steps in the foregoing methods may be implemented in a form of scheduling a program by a processing element. For example, an apparatus used in the terminal includes a processing element and a storage element. The processing element invokes a program stored in the storage element, to perform the methods performed by the terminal in the foregoing method embodiment. The storage element may be a storage element located on a same chip as the processing element, that is, an on-chip storage element.

In another implementation, a program used to perform the method performed by the terminal in the foregoing method may be in a storage element located on a different chip from the processing element, namely, an off-chip storage element. In this case, the processing element invokes or loads the program from the off-chip storage element to the on-chip storage element, to invoke and perform the methods performed by the terminal in the foregoing method embodiment.

In still another implementation, units of the terminal that implement the steps in the foregoing method may be configured as one or more processing elements. These processing elements are disposed on the modem subsystem. The processing element herein may be an integrated circuit, for example, one or more ASICs, one or more DSPs, one or more FPGAs, or a combination of these types of integrated circuits. These integrated circuits may be integrated to form a chip.

The units of the terminal that implement the steps in the foregoing method may be integrated and implemented in a form of a system-on-a-chip (SOC). The SOC chip is configured to implement the foregoing method. At least one processing element and a storage element may be integrated into the chip, and the processing element invokes a program stored in the storage element to implement the foregoing method performed by the terminal. Alternatively, at least one integrated circuit may be integrated into the chip, to implement the foregoing method performed by the terminal. Alternatively, with reference to the foregoing implementations, functions of some units may be implemented by invoking a program by the processing element, and functions of some units may be implemented by the integrated circuit.

It can be learned that the foregoing apparatus used in the terminal may include at least one processing element and an interface circuit. The at least one processing element is configured to perform any one of the methods performed by the terminal provided in the foregoing method embodiments. The processing element may perform some or all steps performed by the terminal in a first manner, that is, by invoking a program stored in the storage element; or may perform some or all steps performed by the terminal in a second manner, that is, by combining instructions and an integrated logic circuit of hardware in the processor element. Certainly, some or all steps performed by the terminal may be alternatively performed by combining the first manner and the second manner.

As described above, the processing element herein may be a general-purpose processor, for example, a CPU, or may be one or more integrated circuits, for example, one or more ASICs, one or more microprocessors DSPs, one or more FPGAs, or a combination of at least two of these types of integrated circuits, configured to implement the foregoing methods.

The storage element may be one memory, or a general term of a plurality of storage elements.

Figure 18:
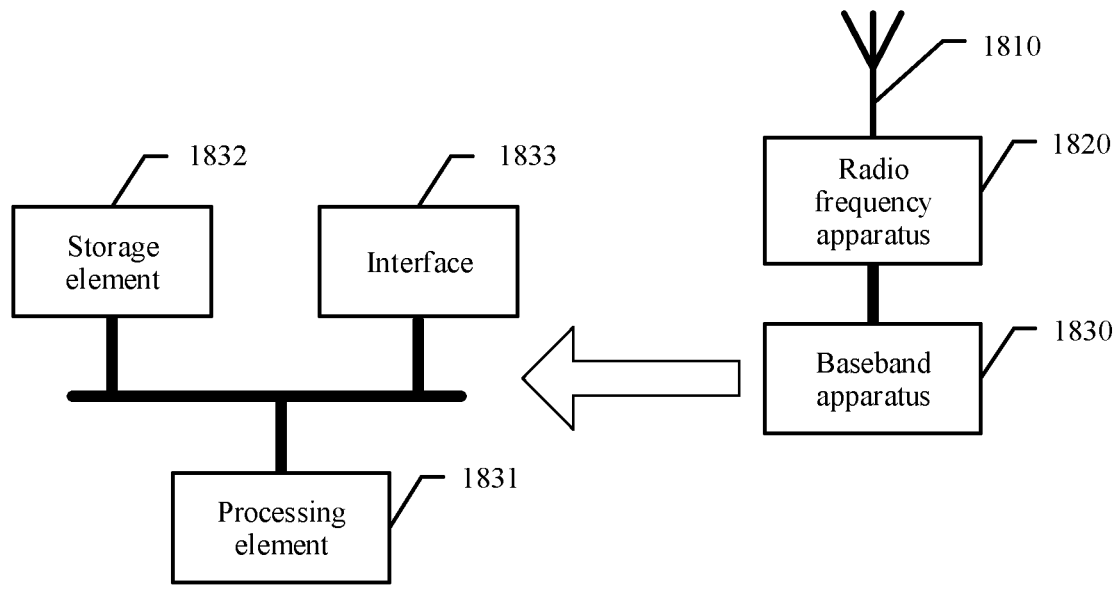
FIG. 18 is a schematic diagram of a structure of a network device according to an embodiment of this application.

FIG. 18 is a schematic diagram of a structure of a network device according to an embodiment of this application. The network device is configured to implement the operations of the network device in the foregoing embodiments. As shown in FIG. 18, the network device includes an antenna 1810, a radio frequency apparatus 1820, and a baseband apparatus 1830. The antenna 1810 is connected to the radio frequency apparatus 1820. In an uplink direction, the radio frequency apparatus 1820 receives, by using the antenna 1810, information sent by a terminal, and sends, to the baseband apparatus 1830 for processing, the information sent by the terminal. In a downlink direction, the baseband apparatus 1830 processes the information about the terminal, and sends the information to the radio frequency apparatus 1820. The radio frequency apparatus 1820 processes the information about the terminal, and then sends the processed information to the terminal by using the antenna 1810.

The baseband apparatus 1830 may include one or more processing elements 1831, for example, include a main control CPU and another integrated circuit. In addition, the baseband apparatus 1830 may further include a storage element 1831 and an interface circuit 1833. The storage element 1832 is configured to store a program and data. The interface circuit 1833 is configured to exchange information with the radio frequency apparatus 1820, and the interface is, for example, a common public radio interface (CPRI). The foregoing apparatus used in the network device may be located in the baseband apparatus 1830. For example, the foregoing apparatus used in the network device may be a chip in the baseband apparatus 1830. The chip includes at least one processing element and an interface circuit. The processing element is configured to perform steps in any one of the methods performed by the network device. The interface circuit is configured to communicate with another apparatus. In an implementation, the units in the network device for implementing the steps in the foregoing method may be implemented in a form of scheduling a program by the processing element. For example, the apparatus used in the network device includes a processing element and a storage element. The processing element invokes a program stored in the storage element, to perform the method performed by the network device in the foregoing method embodiment. The storage element may be a storage element on the same chip as the processing element, that is, an on-chip storage element; or may be a storage element that is on a different chip from the processing element, that is, an off-chip storage element.

In another implementation, the units in the network device for implementing steps in the foregoing method may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated to form a chip.

Units of the network device that implement the steps in the foregoing method may be integrated, and implemented in a form of a system-on-a-chip (SOC). For example, the baseband apparatus that includes the SOC chip is configured to implement the foregoing method. At least one processing element and a storage element may be integrated into the chip, and the processing element invokes a program stored in the storage element to implement the foregoing method performed by the network device. Alternatively, at least one integrated circuit may be integrated into the chip, to implement the foregoing method performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and an interface circuit. The at least one processing element is configured to perform any one of the methods performed by the network device provided in the foregoing method embodiments. The processing element may perform some or all steps performed by the network device in a first manner, that is, by invoking the program stored in the storage element; or may perform some or all steps performed by the network device, in a second manner, that is, by combining instructions and an integrated logic circuit of hardware in the processor element. Certainly, some or all steps performed by the foregoing network device may be alternatively performed by combining the first manner and the second manner.

As described above, the processing element herein may be a general-purpose processor, for example, a CPU, or may be one or more integrated circuits, for example, one or more ASICs, one or more microprocessors DSPs, one or more FPGAs, or a combination of at least two of these types of integrated circuits, configured to implement the foregoing methods.

The storage element may be one memory, or a general term of a plurality of storage elements.

Figure 19:
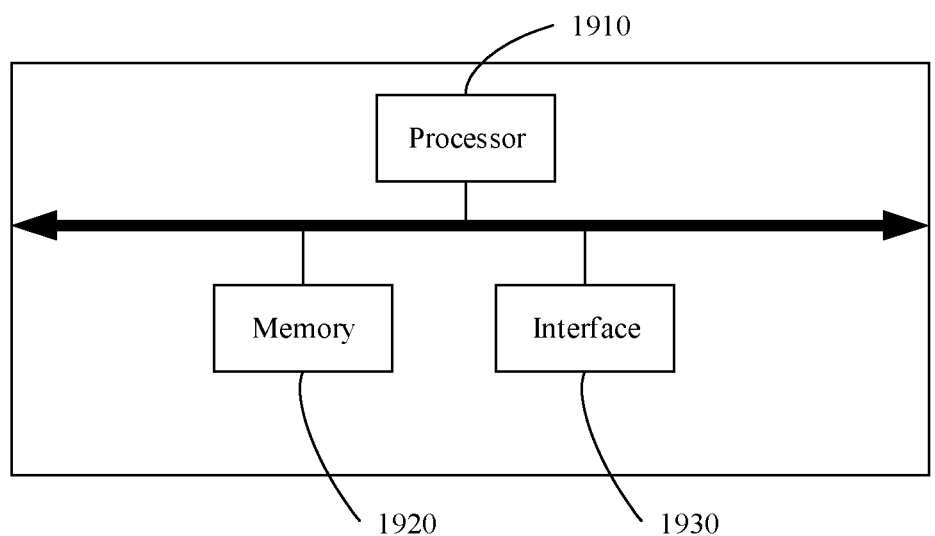
FIG. 19 is a schematic diagram of a structure of a database server according to an embodiment of this application.

FIG. 19 is a schematic diagram of a structure of a database server according to an embodiment of this application. The database server may be the database server in the foregoing embodiments, and is configured to implement operations of the database server in the foregoing embodiments.

As shown in FIG. 19, the network device includes a processor 1910, a memory 1920, and an interface 1930. The processor 1910, the memory 1920, and the interface 1930 are signal-connected.

The foregoing method applied to the database server may be implemented by the processor 1910 by invoking a program stored in the memory 1920. That is, the foregoing apparatus used in the database server includes a memory and a processor. The memory is configured to store a program, and the program is invoked by the processor to perform the methods in the foregoing method embodiment. The processor herein may be an integrated circuit having a signal processing capability, for example, a CPU. Alternatively, the foregoing method applied to the database server may be implemented by one or more integrated circuits configured to implement the foregoing method, for example, one or more ASICs, one or more microprocessors DSPs, one or more FPGAs, or a combination of at least two of these types of integrated circuits. Alternatively, the foregoing implementations may be combined.

In addition, in the embodiments of this application, "a plurality of" refers to two or at least two. "And/or" describes an association relationship for describing associated objects and represents that three relationships may exist. For example, A and/or B may represent the following three cases: Only A exists, both A and B exist, and only B exists. In addition, an element (element) that appears in singular forms "a", "an", and "the" does not mean "one or only one" unless otherwise specified in the context, but means "one or more". For example, "a device" means one or more such devices. Further, "at least one (at least one of) . . . " means one or any combination of subsequent associated objects. For example, "at least one of A, B, and C" includes A, B, C, AB, AC, BC, or ABC. Determining Y based on X does not mean that Y is determined based on only X, and Y may also be determined based on X and/or other information.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, comprising:
   receiving, by a terminal apparatus, information from a network device, wherein the information indicates an air interface status or indicates an amount of data stored by the network device, wherein the information is carried in a Media Access Control control element (MAC CE) and comprises layer information of a plurality of layers and information elements of the respective layers, the plurality of layers comprise a base layer and an enhancement layer, the base layer is for data representing a basic framework of an image, the enhancement layer is for data including detailed information of the image, and each information element indicates a status or a data amount of a corresponding layer;

receiving, by the terminal apparatus, data from the network device; and processing, by the terminal apparatus, the data based on the information.

2. The method according to claim 1, wherein the MAC CE is located in a MAC subPDU, the MAC subPDU comprises a MAC subheader and the MAC CE, the MAC subheader comprises a logical channel identifier (LCID), the LCID uses a preset value, and the preset value indicates that the MAC CE comprises the information.

3. The method according to claim 2, wherein the MAC CE further comprises time information indicating that the data is transmitted within a period of time indicated by the time information.

4. The method according to claim 1, wherein the receiving, by the terminal apparatus, information from the network device comprises:

periodically receiving, by the terminal apparatus, the information from the network device; or receiving, by the terminal apparatus, the information from the network device when the amount of the data stored by the network device is greater than or equal to a threshold.

5. The method according to claim 1, further comprising:

sending, by the terminal apparatus, status indication information to the network device, wherein the status indication information indicates a status of the terminal apparatus.

6. The method according to claim 1, wherein the air interface status comprises a rate, a data amount, a frequency resource size, radio signal quality, or an antenna data amount.

7. An apparatus, comprising:

at least one processor; and a non-transitory memory storing instructions for execution by the at least one processor, wherein the instructions, that when executed by the at least one processor, cause the apparatus to perform operations comprising:

receiving information from a network device, wherein the information indicates an air interface status or indicates an amount of data stored by the network device, wherein the information is carried in a Media Access Control control element (MAC CE) and comprises layer information of a plurality of layers and information elements of the respective layers, the plurality of layers comprise a base layer and an enhancement layer, the base layer is for data representing a basic framework of an image, and the enhancement layer is for data including detailed information of the image, and each information element indicates a status or a data amount of a corresponding layer;

receiving data from the network device; and processing the data based on the information.

8. The apparatus according to claim 7, wherein the MAC CE is located in a MAC subPDU, the MAC subPDU comprises a MAC subheader and the MAC CE, the MAC subheader comprises a logical channel identifier (LCID), the LCID uses a preset value, and the preset value indicates that the MAC CE comprises the information.

9. The apparatus according to claim 7, wherein the MAC CE further comprises time information indicating that the data is transmitted within a period of time indicated by the time information.

10. The apparatus according to claim 7, wherein the receiving information from the network device comprises:

periodically receiving the information from the network device; or receiving the information from the network device when the amount of the data stored by the network device is greater than or equal to a threshold.

11. The apparatus according to claim 7, wherein the instructions, that when executed by the at least one processor, further cause the apparatus to perform operations comprising:

sending status indication information to the network device, wherein the status indication information indicates a status of the terminal apparatus.

12. The apparatus according to claim 7, wherein the air interface status comprises a rate, a data amount, a frequency resource size, radio signal quality, or an antenna data amount.

13. An apparatus, comprising:

at least one processor; and a non-transitory memory storing instructions for execution by the at least one processor, wherein the instructions, that when executed by the at least one processor, cause the apparatus to perform operations comprising:

determining an air interface status or an amount of stored data;

sending first information to a terminal apparatus, wherein the first information indicates the air interface status or the amount of data stored by the network device, the first information is carried in a Media Access Control control element (MAC CE) and comprises layer information of a plurality of layers and information elements of the respective layers, the plurality of layers comprise a base layer and an enhancement layer, the base layer is for data representing a basic framework of an image, the enhancement layer is for data including detailed information of the image, and each information element indicates a status or a data amount of a corresponding layer; and sending data to the terminal apparatus, wherein the first information is sent to the terminal apparatus to determine a processing manner of the data.

14. The apparatus according to claim 13, wherein the instructions, that when executed by the at least one processor, further cause the apparatus to perform operations comprising:

receiving location information from the terminal apparatus, wherein the location information indicates a location of the terminal apparatus; and sending the location information to a database server.

15. The apparatus according to claim 14, wherein the instructions, that when executed by the at least one processor, further cause the apparatus to perform operations comprising:

sending second information to the database server, wherein the second information indicates the air interface status; and obtaining, from the database server, the data that is generated based on the air interface status and the location of the terminal apparatus.

16. The apparatus according to claim 13, wherein the instructions, that when executed by the at least one processor, further cause the apparatus to perform operations comprising:

obtaining, from a database server, first data that is generated based on the location of the terminal apparatus, wherein the data sent to the terminal apparatus is second data; and generating the second data by using the first data based on the air interface status.

17. The apparatus according to claim 13, wherein the sending the first information to the terminal apparatus comprises:

periodically sending the first information to the terminal apparatus; or sending the first information to the terminal apparatus when the amount of the data stored by the network device is greater than or equal to a threshold.

18. The apparatus according to claim 13, wherein the air interface status comprises a rate, a data amount, a frequency resource size, radio signal quality, or an antenna data amount.

\* \* \* \* \*